United States Patent
Gonzalez

(10) Patent No.: US 10,785,197 B2
(45) Date of Patent: Sep. 22, 2020

(54) SYSTEM AND METHOD FOR DISTRIBUTED INTERNET SHARING

(71) Applicant: Jose Luis Merino Gonzalez, London (GB)

(72) Inventor: Jose Luis Merino Gonzalez, London (GB)

(*) Notice: Subject to any disclaimer, the term of this patent is extended or adjusted under 35 U.S.C. 154(b) by 0 days.

(21) Appl. No.: 16/197,101

(22) Filed: Nov. 20, 2018

(65) Prior Publication Data
US 2019/0158469 A1  May 23, 2019

Related U.S. Application Data

(60) Provisional application No. 62/588,951, filed on Nov. 21, 2017.

(51) Int. Cl.
| | |
|---|---|
| *H04L 29/06* | (2006.01) |
| *H04W 4/70* | (2018.01) |
| *H04W 4/80* | (2018.01) |
| *H04W 12/06* | (2009.01) |
| *H04B 17/318* | (2015.01) |
| *H04L 9/08* | (2006.01) |
| *H04L 9/32* | (2006.01) |
| *H04W 8/18* | (2009.01) |
| *H04W 88/06* | (2009.01) |
| *H04W 84/12* | (2009.01) |

(52) U.S. Cl.
CPC ....... *H04L 63/0428* (2013.01); *H04B 17/318* (2015.01); *H04L 9/0861* (2013.01); *H04L 9/3215* (2013.01); *H04W 4/70* (2018.02); *H04W 4/80* (2018.02); *H04W 12/06* (2013.01); *H04L 2209/56* (2013.01); *H04L 2209/80* (2013.01); *H04W 8/183* (2013.01); *H04W 84/12* (2013.01); *H04W 88/06* (2013.01)

(58) Field of Classification Search
CPC .................. H04L 63/0428; H04L 9/0861
See application file for complete search history.

(56) References Cited

U.S. PATENT DOCUMENTS

| 8,744,511 | B2 * | 6/2014 | Jones, IV | H04W 52/283 370/318 |
|---|---|---|---|---|
| 2007/0037605 | A1 * | 2/2007 | Logan | G08B 13/1427 455/567 |
| 2014/0127992 | A1 * | 5/2014 | Kuscher | H04B 5/0031 455/41.1 |
| 2014/0220898 | A1 * | 8/2014 | Zhang | H04W 16/14 455/41.2 |
| 2015/0163846 | A1 * | 6/2015 | Weizman | H04W 52/0225 455/41.2 |
| 2016/0232353 | A1 * | 8/2016 | Gupta | G06F 21/566 |
| 2016/0242262 | A1 * | 8/2016 | Chen | H05B 37/0272 |
| 2016/0262116 | A1 * | 9/2016 | Ying | H04B 1/385 |
| 2018/0131408 | A1 * | 5/2018 | Austad | G06F 21/606 |
| 2018/0310301 | A1 * | 10/2018 | Amini | H04L 1/18 |
| 2019/0158469 | A1 * | 5/2019 | Gonzalez | H04B 17/318 |

* cited by examiner

*Primary Examiner* — Parth Patel
(74) *Attorney, Agent, or Firm* — Saul Ewing Arnstein & Lehr LLP

(57) ABSTRACT

Aspects of the disclosure relate to communication systems. In particular aspects relate to internet enabled wireless mobile devices, computer program products, non-transitory storage mediums, methods and systems for improving access to the internet.

21 Claims, 4 Drawing Sheets

Distributed internet sharing system ("DISS")

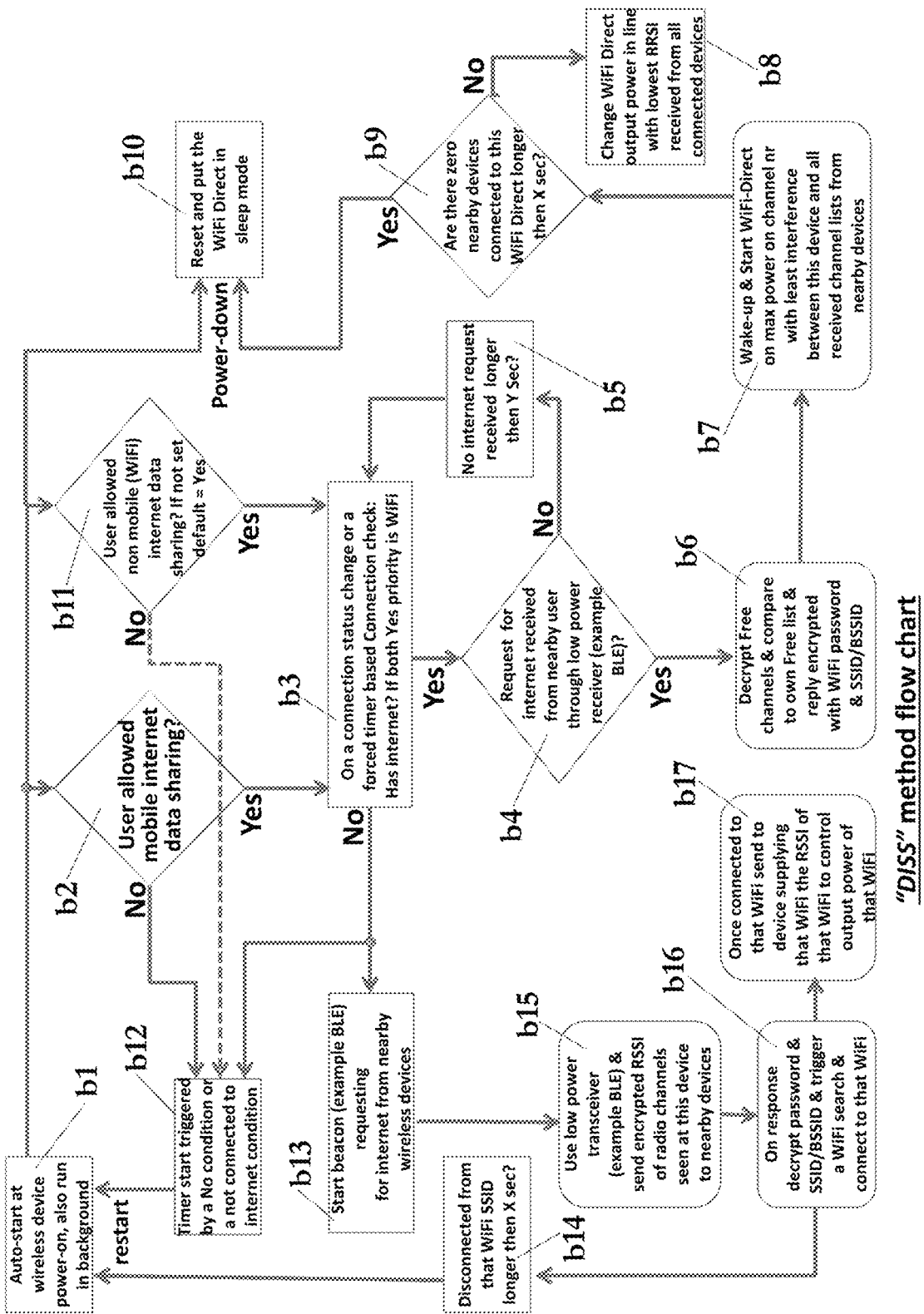

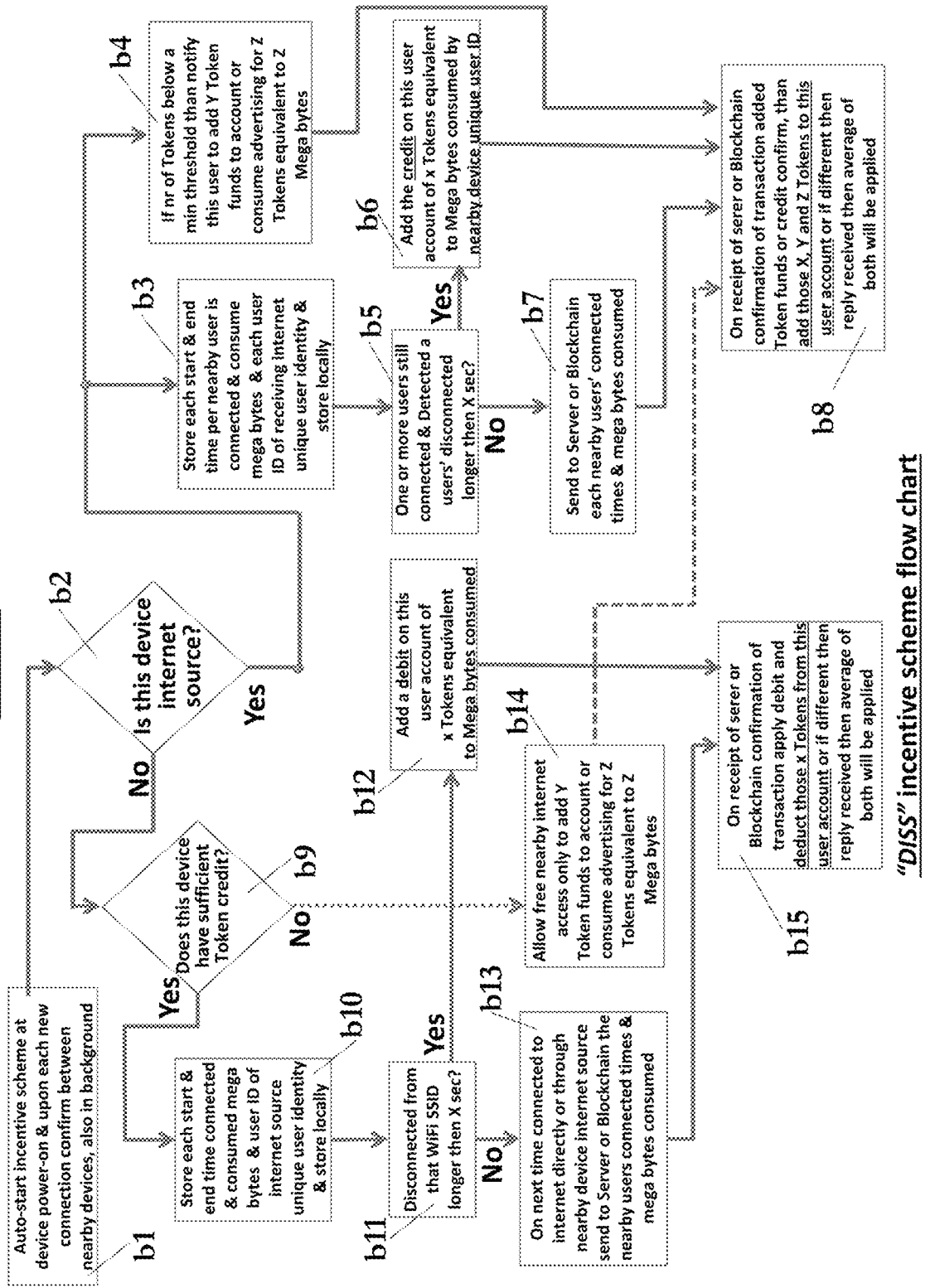

SYSTEM AND METHOD FOR DISTRIBUTED INTERNET SHARING

CROSS-REFERENCE TO RELATED APPLICATIONS

This application is based on, and claims priority to, U.S. Provisional Application No. 62/588,951, filed on Nov. 21, 2017, the entire contents of which being fully incorporated herein by reference.

FIELD OF THE INVENTION

A system and method of operating a distributed internet sharing communications system to enable internet access between nearby wireless devices (smartphones, tablets, MiFi) adapted as per this invention. Aspects of the disclosures relate in particular to a system and method of enabling a wireless device adapted as per this invention that have no internet connection at a given location to make and keep a reliable and secure data connection with reduced power consumption through neighbouring wireless device(s) adapted as per this invention that do have a direct internet connection, to connect indirectly to the internet. This invention or adaptation of the wireless device does not use any VPN (virtual private network), nor any existing wireless device tethering or personal hotspot functions but requires at least 3 or more different built-in radio transceivers in the wireless device. Specifically such wireless device users with access to the internet may need to be incentivised in a reward based method or system trading Mega bytes for crypto money, traditional money, Tokens or Credit points, particularly to motivate them to share their Mobile internet data which they paid for and in some lesser cases also to motivate them to share their WiFi internet data.

BRIEF SUMMARY OF THE INVENTION

The present invention is designed to overcome the shortcomings of the prior art and to provide an automated way of resolving the shortcomings of the prior art, specifically for Internet enabled wireless devices capable of downloading a proprietary module or software module from the Internet in the form of an application (APP). Such software module when downloaded onto the Internet enabled wireless device renders the software module operable to communicate with other wireless devices with the same such software module downloaded on to such other wireless devices and without requiring any server and such proprietary module not using any VPN (virtual private network) and not using the tethering or personal hotspot function of the wireless device in which it is downloaded into. The software module of this invention provides an additional non optional security level by encrypting the payload, meaning applied on any information or data or internet communication requests (internet petitions) and on the answers to such internet communication requests exchanged between wireless devices.

The invention security may be increased optionally even further by (i) incorporating in the software module an automatic proxy authentication between proprietary modules downloaded into the wireless devices. A wireless device user becomes automatically an authorized user as a wireless device becomes an authorized wireless device user upon download of the software module of this invention onto his wireless device, (ii) the software module filtering the internet communication request (internet petition) between wireless devices allowing only secure communication requests (internet petitions) such as those that contain https in the communication request URL, (iii) and optionally the software module filtering the internet communication requests (internet petitions) ignoring any communication request that contains in its URL a domain different then the allowed domains list in the software module look-up table, (iv) and optionally the software module incorporating a firewall function just before encrypting the data send and just after decrypting the data received from nearby wireless devices.

It's such proprietary module or also referred to as software module when downloaded into an Internet enabled wireless devices (smartphone or tablet) together with all such other different wireless devices with a downloaded software module, that jointly form the DISTRIBUTED INTERNET SHARING SYSTEM (DISS) or in other words a system and method that resolves the shortcomings of the prior art for interfacing and connecting an Internet enabled wireless device, with a downloaded proprietary module, to a public Internet network (WiFi access point, WiFi network or Mobile network).

The present invention will resolve the following shortcomings of the prior art, namely to:
(i) increase data security exchanged between wireless devices with a downloaded proprietary module, for both signalling channel as well as for shared internet data itself;
(ii) reduce in some case and dramatically improve in most cases de robustness to radio interference between nearby wireless devices and other commercial devices transmitting in the same frequency band, such watches with built-in Bluetooth, WiFi hotpots, 3rd party wireless devices using tethering or personal hotspot, internet of things (IoT) devices;
(iii) reduce in some case and dramatically improve in most cases de reduction in power consumption during non internet sharing period or signalling period and during the actual internet data sharing period both at the wireless device, with the built-in-in software module, that has no direct internet access and mainly reduce on the wireless device, with the built-in-in software module that has no direct internet access; and
(iv) optionally to make use of a Ledger server or traditional Server to interact with the user devices to incentivize especially users of mobile data form wireless devices with the built-in software module through an incentive method of trading consumed Mega bytes for "crypto money or Tokens or traditional money or credit points" and vice versa, based on a secure and reliable transactions and accounts record keeping based on Blockchain Smart Contracts or based on proprietary server modules running on traditional servers instead of on a Ledger server.

The shortcomings of the prior art have been addressed by the present invention and resolved by the novelty of the combination of a proprietary module or also referred to as Software module that becomes operable when downloaded into an Internet enabled wireless device (smartphone or tablet or MiFi). All those software modules, operable when downloaded into a wireless device, jointly and optionally with a Server or Ledger respectively with a build-in proprietary server software module or Smart Contracts resolve all the prior art short comings as described in the embodiments and claims of this invention.

BACKGROUND OF THE INVENTION

The inventor of this patent refers as the closest prior art to a patent written by the same first inventor of the 3 Feb. 2015 UK patent application number 1501723.9, published on 11

Aug. 2016 as International application number PCT/GB2016/050241 with title SYSTEM AND METHODS FOR A GLOBAL WIRELESS INDIRECT INTERNET CONNECT SYSTEM.

Incorporating the above mentioned patent prior art herein as point 1.1 and the shortcomings are described in point 1.2 whist additional complementary prior art is described and analyzed in point 1.3. This invention overcomes the shortcomings of all the prior arts of point 1.1, 1.2 and 1.3 as described in the embodiments and the claims of this invention.

Point 1.1 Background of the Invention Part 1

Wireless devices have evolved to become smart devices or also called smartphones or tablet and can now handle voice and data directly or through downloaded software Apps. Such wireless devices (smartphones and tablets) have typically multiple hardware radio allowing the wireless device to connect to the Internet over different wireless networks, such as through mobile networks (WCDMA, PCS, GSM, GPRS, 2G, 3G, 4G, LTE, etc.), through WiFi (wireless fidelity) as known by end-users or as referred to by the technically skilled as Wi-Fi (wireless fidelity) and through Bluetooth. In some wireless devices, such as some lower end tablets, where the only hardware radio connection available to connect to the Internet is only through Wi-Fi or through Bluetooth.

In more recent times wireless devices (smartphones and tablets) also have a so called "personal hotspot" feature which then converts the wireless device that shares connection to the mobile network Internet through its Wi-Fi or Bluetooth radio with other wireless devices that are allowed to connect to it.

The latest wireless devices variant of previous mentioned smartphones or tablet with a "personal hotspot" feature have resulted in several manufacturers to release so called MiFi-devices, which are wireless devices that have only function, namely to act always as a "personal hotspot". These MiFi devices typically allow 5 or more different wireless devices to connect to the MiFi device through Wi-Fi and then to the Internet through the MiFi Internet connection to a mobile network, typically requiring a valid SIM (subscriber identity module) in the MiFi device.

Any such wireless device that connects to a mobile network to the Internet requires a valid subscription and depending on the mobile network operator also requires a valid SIM. All wireless devices with a valid SIM connect to the HLR of the mobile network operator when in the coverage area serviced by their home mobile network operator but connects to a VLR when in the coverage area not serviced by their home mobile network operator, this last typically when roaming.

Competition driven mainly by innovations and often protected by patents which are licensed to third parties rather than by regulation have driven mobile network operators to provide to their users bundles with unlimited calls and text messages and a reasonable amount of megabytes of data to connect to the Internet in the same bundle within the area(s) where the mobile network operator provides radio coverage service to its users. Some mobile network operators provide also data only bundles for use in the coverage area (country) where it provides radio coverage to its users yet still high data usage prices when roaming abroad or when users connects to the Internet through a mobile network operator servicing such coverage area not serviced directly by the home mobile network operator of the SIM of the end user.

Mobile network operators and mobile virtual network operators make their profit typically on user breakage when providing bundle pricing for in-country unlimited calls, text including a reasonable amount of data (500 MB, 1 GB, 5 GB, etc. where MB is megabyte and GB is gigabyte) to connect to the Internet or a data only bundle to connect to the Internet. Breakage means that the end-user in order not to pay extra much higher prices per MB over and above his data bundle(s) allowance.

In the past years the amount of data allowance per bundle has been increasing consistently and is expected to increase in the future, for example where for a given bundle cost the amount of data allowance per month was a 2 years ago 500 MB, it increased for the same cost to around 1 GB a year ago and is currently close to becoming for the same cost a monthly data allowance of 3 GB. In practice although mobile data usage by end-users has increased it has not increased in the same amount that mobile network operators are increasing the monthly data allowance year on year for the same price year on year user get a lot more data allowance. Typically a wireless device (smartphone and tablet) end-user uses quite a lot less than the maximum data amount allowance of that month and that unused monthly data is what is known as breakage is likely to increase in the future.

The biggest breakage is achieved by mobile network operators when a wireless device user is roaming or in a different country connected to a different mobile network operator because the data bundle allowance in roaming is very small or in most cases only applies to data usage for connecting to the Internet only on his home country when connected to the end-user's wireless device SIM home country connected to its home mobile network operator.

When looking at the prior art, current wireless devices (smartphones and tablets) with the "personal hotspot" features and a valid SIM or "MiFi" devices with a valid SIM, do not resolve the high Internet data cost to end-users when roaming or the high data cost over and above the data bundle allowance. The prior art does also not allow end-users access to the Internet when such end-user with a wireless device has no SIM credit (typically when prepay) or with a valid SIM but without any further mobile data allowance to allow such wireless device end-user to continue using the Internet without requiring to top up his mobile network operator SIM credit nor without requiring an additional MiFi device with an additional SIM with valid credit for data allowance.

Attempts have been made by companies such as Apple, Samsung, Huawei, and many other smartphones and tablets manufacturers providing embedded in their wireless hardware devices previous mentioned feature called "personal hotspot" as a software setting such that the wireless device becomes a "hotspot" performing the same function as a "MiFi" device. The end-user can activate or deactivate such "personal hotspot" function whereby the wireless device automatically disconnects itself from any data connection to a Wi-Fi or Bluetooth network and establishes instead a data connection to the mobile network operator associated with the valid SIM inside the wireless device.

Then the wireless device with the "personal hotspot" function activated allows other different to the previous authorised different wireless devices with a Wi-Fi or Bluetooth radio to connect to the Internet through Wi-Fi or Bluetooth of the wireless device with the "personal hotspot" function activated.

Companies such as Huawei, Alcatel and many other MiFi manufacturers provide a wireless device that is cheaper than a typical smartphone or tablet where the only function is to provide a permanent "personal hotspot" and such devices are commonly known as MiFi devices. Such MiFi devices do not require the end-user to activate or deactivate the "personal hotspot" as it's the only permanent function the MiFi device is designed to provide subject to having a valid SIM in the MiFi device. The fact that such MiFi device requires a valid SIM means in most if not all cases that end-users require at least two devices, their most commonly used smartphone or tablet plus an extra device such as the MiFi device. The shortcomings of the prior art when using a MiFi device are the same as when using a wireless device, because both require a valid SIM and thus both do not resolve the main issues listed previously, of using excess monthly data bundle allowance nor having access to the Internet when no data credit on the SIM of the MiFi nor the credit on the SIM of the smartphone or tablet.

Moreover certain tablet models from Apple, Samsung and other manufacturers do not have a SIM and thus such users with such tablet without a wireless device or MiFi with a valid SIM or a SIM without data credit cannot connect to the Internet when not at his home or office Wi-Fi or has to find a public free hotspot.

Probably one of the most successful attempts to address partially the shortcomings of the prior art was by Mr Martin Varsaysky, who according the website http://en.wikipedia.org/wiki/Martin_Varsavsky, extraction of 20 Jan. 2015 quote "launched the company FON in Madrid at the end of 2005, which provides Wi-Fi services using user-generated infrastructure. Fon is backed by investors Google, Skype, Index Ventures and Sequoia Capital. In 2012, the network reached over 7 million hotspots in several countries." Un-quote.

As extracted on 20 Jan. 2015 from the FON official website https://corp.fon.com/en, quote "Fon is your Global Wi-Fi Network. It's built by people just like you. Fon members share a bit of their home Wi-Fi, and in turn get free access at millions of other Fon hotspots worldwide. Joining is easy. All you have to do is buy a Fon Wi-Fi router and plug it into your broadband connection. No monthly fee! Or, if you live in a country where Fon has a Telco partner, just sign up with them to become a member." "Your global Wi-Fi Network. Join Fon and get free access to 14,136,008 Fon spots. Share a little Wi-Fi and roam the world for free." Un-quote.

Although the prior art by FON has grown to more then 14 million Wi-Fi hot-spots worldwide, it must be noted that such hotspots are fixed Wi-Fi hotspots mostly provided by private homes or small business through individuals or business having to purchase a Wi-Fi router hardware device connected to their fixed line Internet (ADSL, DSL fibre, etc.). In areas of high user concentration such as cities where high-rise apartments are common such Wi-Fi routers coverage provided vertically is of little or no use to most end-users. Furthermore the penetration of mobile subscribers has outperformed by far the fixed line subscriptions and thus the coverage footprint by those FON subscribed Wi-Fi routers can only provide a very small radio coverage footprint with their Wi-Fi routers even if 100% of all fixed line users would purchase a Wi-Fi router and subscribe to Fon in comparison to the more than 7 Billion mobile subscriber devices that could provide Wi-Fi and/or Bluetooth radio coverage globally with a foot print multiple times bigger.

A further shortcoming of the FON system, apart from the fact that users who subscribe to Fon has to purchase an additional hardware device Wi-Fi router and have a fixed Internet connection, is the fact that the FON Wi-Fi routers have to be replaced in time whilst the current invention does not require any additional hardware to purchased at all by user who wish to subscribe or share the benefits of this invention.

Also the fact that the FON hotspots are mostly indoors Wi-Fi routers connected to fixed line Internet in people's homes renders to coverage area for actual use by end-users very limited when comparing to the sheer amount of mobile smartphone users to find other smartphone users is the proximity is extremely high simply by the high amount of penetration of mobile subscriptions.

A feature of the FON system, that is a benefit as much as it is a shortcoming is the fact that the Fon system is strictly based on fixed Wi-Fi router devices located at people's homes and small offices mainly, which makes their geographical deployment extremely difficult to be where there are mostly needed, namely wherever a high concentration of Wi-Fi enabled wireless devices (such as smartphones and tablets) are at given times.

A more recent attempt to resolve some of the shortcomings of the previously explained prior art, was made by Burcham, et al. (Burcham) through U.S. Pat. No. 8,644,255 of February 2014 with the following patent identification: Assignee: Sprint Communications Company L.P. (overland Park, Kans.), Family ID: 50001705, application Ser. No. 13/070,607, Filed: Mar. 24, 2011, and any such References Cited by Burcham.

Burcham's prior art titled "Wireless device access to communication services through another wireless device" describes the patent novelty in his abstract as follows: Quote "A method of operating a communication system is disclosed which includes, in a wireless communication device, transferring a wireless beacon signal and responsively receiving a wireless access request from a user device, determining if a user identifier received with the wireless access request has usage credits in a data structure, exchanging wireless signals with the user device and with a wireless communication network based on the usage credits to provide a wireless communication service to the user device, and decrementing the usage credits for the user identifier in the data structure. The method also includes wirelessly transferring usage credit updates for receipt in a master data structure." Un-quote.

Burcham's prior art further describes the patent novelty in his Claim 1 as follows: Quote "1. A method of operating a communication system, the method comprising: in a first user device, transferring a wireless beacon signal and responsively receiving a first wireless access request from a second user device indicating a user identifier, processing the user identifier in a first data structure to determine if the user identifier has usage credits, and if the user identifier has the usage credits, exchanging wireless signals, through the first user device, with the second user device and with a wireless communication network to provide a wireless communication service to the second user device, decrementing the usage credits in the first data structure for the user identifier, and wirelessly transferring first data structure updates; in a control server, receiving and processing the first data structure updates to update a master data structure; in a third user device, transferring the wireless beacon signal and responsively receiving a second wireless access request from the second user device indicating the user identifier, processing the user identifier in a second data structure to determine if the user identifier has the usage credits, and if the user identifier does not have the usage credits, transferring a usage request indicating the user identifier; in the control server, receiving and processing the usage request indicating the user identifier against the master data structure to generate and transfer an update message for the second data structure; in the third user device, receiving and processing the update message for the second data structure to update the second data structure, processing the user identifier against the second data structure to determine if the user identifier has the usage credits, and if the user identifier has the usage credits, exchanging the wireless signals, through the third user device, with the second user device and with the wireless communication network to provide the wireless communication service to the second user device, decrementing the usage credits in the second data structure for the user identifier, and wirelessly transferring second data structure updates." Un-quote.

The prior art by Burcham is particularly beneficial to Mobile network operators to increase the paid usage of their data networks to monetize on their infrastructure investments. Burcham refers to paid usage as "usage credit".

However Burcham does not resolve the shortcomings that this invention is specifically addressing to resolve, as described in the text and illustrated in drawings (figures) but specifically as protected novelty described in the Claims herein. As a matter of illustration, the following are a summary of the shortcomings that the prior by Burcham does not resolve. Burcham specifically has the following conditions or limitation explicitly required by "the method" and "the communication system";

two different user devices (first user device and a third user device) to connect another user device (second user device), three different data structures (first-, second-, master data structure), and a control server, wireless communication network, first user device and third user device are registered users with usage credit for the wireless communication network's services second user device identifiers accessing wireless communication service must have usage credit to access wireless communication network through first and third user device.

Our invention resolves the shortcomings of Burcham, in that in our invention there is no such restriction of requiring 3 user devices for a data connection to one of them, in other words Burcham requires two different user devices (first user device and a third user device) to connect another user device (second user device), whereas our invention only requires any such two wireless devices referred to by Burcham as "user devices".

Also Burcham requires three different data structures and a control server for the connection set-up whereas our invention does not require any such data structure nor any such server to set-up a data connection. Actually in our invention a server is optional to support additional optional features but is not required for the data connection from user devices to the communication system.

Another mayor restriction or condition of Burcham is that it requires user devices that wish to make use if its invention (as per Burcham second user device) to have "usage credit", meaning to pay for the access to the services such as data or Internet access) of the wireless communication network to which the sharing user devices (as per Burcham first user device and third user device) are connected to. This last in itself is such a major restriction in that, although commercially beneficial to the owners of the wireless communications network such as Mobile network Operators, it limits the scope of the invention to a relatively fragmented and thus small market segment of the global 7.1 Billion mobile subscriber base simply because the huge amount of Mobile Networks Operators per country times the amount of countries. In the end the invention of Burcham does not benefit the global 7.1 Billion mobile subscribers because end users still have to pay in order to access the benefits of the invention of Burcham and thus why connect indirectly if there is no financial benefit or cost reduction to the end user. In the communications system of Burcham end users can just as well get a direct service contract or pre-pay contract directly with the wireless communication network.

In our invention there is no such requirement for any such wireless device end user to have any credit (referred to by Burcham as user device identifier usage credit) at all to make use of the benefits of our invention. In fact our invention relies on the basis that wireless device users that download our invention software module that has direct wireless data access to share Internet data connection with any other wireless device users that also downloaded our invention software module does not have direct wireless data access without such last needing any credit at all to connect to the Internet through the first device and without any interaction with any server for such Internet data connection.

Another different prior art, less successful in terms of the low amount of users compared to previous mentioned prior arts, extracted on 2 Feb. 2015 can be found on this Internet website http://opengarden.com where they mention; quote "5 Million users. Check out how we improve your connectivity" unquote. On a different page within previous website, namely on http://opengarden.com/apps it states; quote "Open garden is a wireless mesh networking application . . . ." Un-quote. On http://opengarden.com/faq#faq-security-005 it states; quote "Since the Open Garden clients use VPN functionality to route traffic and it is not possible to run simultaneous VPNs on the operating systems we support, Open Garden cannot work when a VPN is running . . . ." unquote. VPN stands for Virtual Private Network. On http://opengarden.com/faq#faq-start-002 it states; quote "Assuming you already installed Open Garden on a nearby device, press "Connect" on one or both devices and wait. For the first time connection, Open Garden needs to learn about nearby devices and will do so using one of three methods: WLAN, when the devices are connected to the same Wi-Fi network; location services, when the devices are connected to separate networks; and Bluetooth, when one of the devices is without Internet access completely, in this situation you can manually pair devices with Bluetooth to force a connection over Open Garden . . . ." Un-quote.

The shortcomings of Open Garden are numerous, but the main shortcomings are;

that the downloaded Open Garden software on a wireless device requires one or more nearby device users to manually click on the screen to force a connection the first time connection;

that when a nearby device has no Internet access at all then again such wireless device user has to manually pair the 2 or more nearby devices with the downloaded Open Garden software;

that Open Garden when downloaded into a wireless device requires such wireless device to route all shared data traffic through a VPN.

Our invention does not have any of the previous mentioned limitations of Open Garden in that the our invention as described herein;

does not require any manual intervention of any of the wireless devices users with a downloaded software of this invention to allow Internet Access the first time;

does not require any manual intervention of any of the wireless devices users with a downloaded software of this invention to allow Internet Access the first time;

does not require any manual intervention to pair any of the wireless devices users with a downloaded software of this invention to allow Internet Access even if one of them has no direct Internet access at all;

does not require the use of a VPN in order to allow wireless devices users with a downloaded software of this invention to access the Internet through nearby wireless devices with a downloaded software of this invention;

does not have the restriction when one of the devices has no internet connection to use it the first time to be limited to connect to another device with internet through Bluetooth only, actually our invention is specifically targeted to wireless devices without internet connection and thus connect through wireless devices with internet connection through any available radio module by both wireless devices with a downloaded module of this invention.

Our invention resolves all the prior art shortcomings because the wireless devices with a build-in software module as per this invention, is not limited to only paying users nor limited to the wireless devices that use a VPNs nor is any user interaction required to enable access the Internet through a neighbouring wireless devices with a build-in software module as per this invention, but rather our novelty allows Internet access to function for all wireless devices with no direct internet access provided they download the software module herein. By the sheer amount of wireless devices in any given place around the world our invention provides the best additional Internet access coverage for end-users in areas with high concentration of people, wherever that may be. This last is particularly illustrated because end users carry their wireless devices with them, that combined with the fact that there are currently around 5 times more wireless devices then landlines, according to gsgtelco.com (see further in SUMMARY OF THE INVENTION more details) by at least a ratio of 5.4 B mobiles in use to 1.1 B landlines=4.9 times up to 7.1 B mobiles accounts to 1.1 B landlines=6.4 times.

The following is a brief explanation of the industry term VPN, as background information. A Virtual Private Network (VPN) according to Wikipedia's website http://en.wikipedia.org/wiki/Virtual_private_network; quote "A VPN extends a private network across a public network, such as the Internet . . . . A VPN is created by establishing a virtual point-to-point connection through the use of dedicated connections, virtual tunneling protocols, or traffic encryptions . . . . One major limitation of traditional VPNs is that they are point-to-point, and do not tend to support or connect broadcast domains . . . . To prevent disclosure of private information, VPNs typically allow only authenticated remote access and make use of encryption techniques . . . . Mobile VPNs are used in a setting where an endpoint of the VPN is not fixed to a single IP address, but instead roams across various networks such as data networks from cellular carriers or between multiple Wi-Fi access points. . . . Instead of logically tying the endpoint of the network tunnel to the physical IP address, each tunnel is bound to a permanently associated IP address at the device." Unquote.

Point 1.2 Background of the Invention Part 2

The most recent and closest prior art, as mentioned above, is the prior art patent by the same author of this patent who was also the $1_{st}$ inventor Merino et al. of the 11 Aug. 2016 patent published as International application number PCT/GB2016/050241 with title SYSTEM AND METHODS FOR A GLOBAL WIRELESS INDIRECT INTERNET CONNECT SYSTEM and with priority date 3 Feb. 2015. It describes the patent novelty in his two independent claims as follows: Quote "Claim 1. A wireless communication system, WIRELESS INDIRECT INTERNET CONNECT SYSTEM (WINICS), comprising of wireless devices with a downloaded software module without requiring the use of a VPN (virtual private network) and wherein;

a) the wireless devices are Internet enabled mobile phones, smartphones or tablets, with at least two or more different build-in radio transceivers of which one radio transceiver is at least one local area transceiver (Wi-Fi or Bluetooth), adapted to download the software module. Such a wireless device (WD) when downloading the software module (SM) automatically upon download of the SM into the WD makes the SM operable to access the WD functions and also makes the SM operable to communicate with any such other SM downloaded into any such different wireless device (WDn). Any such different wireless device (WDn) becomes also automatically an authorised wireless device of the WINICS upon download of the SM into such WDn;

b) the software module (SM1) operable when downloaded into the wireless device (WD1), such WD1 without direct Internet data connection within range, then the SM1 communicates with such nearby software module (SM2) downloaded into a different wireless device (WD2) within range of WD1, such WD2 with direct Internet data connection. SM1 and SM2 communicate through such WD1 and WD2 commonly available and compatible wireless local area data connection (Wi-Fi or Bluetooth), meaning any such non-mobile network data connection between WD1 and WD2, such that WD1 through the software modules SM1 and SM2 establishes automatically an indirect bidirectional Internet data connection from WD1 through WD2 with the Internet;

c) all the software modules of this concept 1, downloaded into wireless devices globally, jointly form the WINICS." unquote.

This above prior art Claim was written by the same author as this patent, and recognizes the shortcoming of the previous mentioned patent specifically in that the data security and the integrity of the internet data or any such other data, such as but not limited to signalling data, between wireless devices is not addressed at all. Moreover in areas of high number of wireless device users or smartphones and tablet users in close proximity particularly, radio interference between nearby wireless devices resulting in transceiver performance degradation, increased bit error rates or in some cases resulting in complete transmission loss is also not taken care off.

And last but not least the power consumption during actual internet data sharing period between nearby wireless devices is also not considered in any of the prior art herein. These shortcoming as well as those described in the following additional prior art has been resolved in the novelty of this patent as described in the embodiments and the claims of this invention.

Point 1.3 Background of the Invention Part 3

The following are four additional prior arts, extracted from the 3 Feb. 2016 PCT "Notification of transmittal of the international search report and the written opinion of the International Searching Authority, or the declaration." In relation to the above mentioned patent PCT/GB2016/050241 with priority date 3 Feb. 2015;

D1, being the "2013 12th IEEE International Conference on Trust, Security and Privacy in Computing and Communications" publication with title "Achieving Collaborative Wi-Fi Sharing without Changing Current Technologies".

D2, being the "IEEE/ACM TRANSACTIONS ON NETWORKING, VOL. 22, NO. 5, OCTOBER 2014" with title "Design, Realization, and Evaluation of DozyAP for Power-Efficient Wi-Fi Tethering" by Hao et al.".

D3, being the "IEEE INFOCOM 2014—IEEE Conference on Computer Communications" with title "Enabling crowd-Sourced 1\1Io-bile Internet Access" by "Iosifidis et al".

D4, being the 2009 publication "Cool-Tether: Energy Efficient On-the-fly Wi Fi Hot-spots using Mobile Phones" by Sharma et al.

The first thing to address is the following search report mention, quote "The subject-matter of the claims has been understood as a system comprising at least two wireless devices which download a software and based on the pre-authentication due to the downloaded software, a device tethers its internet connection to the other device.".

The prior art D1 relies on using a tethering function, which prior art patent PCT/GB2016/050241 acknowledged in its BACKGROUND OF THE INVENTION refereeing to it as follows;

Quote "In more recent times wireless devices (smartphones and tablets) also have a so called "personal hotspot" feature which then converts the wireless device that shares connection to the mobile network Internet through its Wi-Fi or Bluetooth radio with other wireless devices that are allowed to connect to it. The latest wireless devices variant of previous mentioned smartphones or tablet with a "personal hotspot" feature have resulted in several manufacturers to release so called MiFi-devices, which are wireless devices that have only function, namely to act always as a "personal hotspot"." unquote.

Since D1 was already addresses properly already in the prior art patent PCT/GB2016/050241, this patent prior art section draws the attention to the fact that the "tethering" function or referred to as "personal hotspot" function is not used as can be seen in one dependant and one independent Claim, of PCT/GB2016/050241, in that the "beacon" is transmitted by the wireless device without any internet connection and not by the wireless device with internet connection as is the case when using as the researcher states, when "a device tethers its internet connection". The device that tethers the internet is the device that transmits the beacon, which is unacceptable power consumption even when no wireless device without internet is nearby.

Furthermore D1 is based on activating the embedded tethering function of a wireless device, as stated in their title, quote "without Changing Current Technologies" unquote, and as stated in D1 Abstract, quote "without having to install new hardware anywhere or to flash or root Wi-Fi sharing devices" unquote. Unfortunately current technologies have shortcoming that have still not been addressed by all the prior arts, including by both D1 and PCT/GB2016/050241 in particular on how to reduce the radio interference as outlined in the embodiments and claims of this invention.

D2 discloses methods for power-efficient WiFi tethering. None of which mentioned in D2 have been mentioned nor used in the patent PCT/GB2016/050241, simply because the only power reducing method mentioned in that patent was to have the wireless device with no internet to transmit the beacon rather than the wireless device with internet. In D2 the power consumption reduction method relates to the sleep method of the wireless device with the tethering function active. Quote ""We design a simple yet reliable sleep protocol to coordinate the sleep schedule of the tethering phone with its clients without requiring tight time synchronization. Furthermore, we develop a two-stage, sleep interval adaptation algorithm to automatically adapt the sleep intervals to ongoing traffic patterns of various applications." unquote.

A shortcoming of the D2 power reduction method has a specific shortcoming address by PCT/GB2016/050241 in that the wireless device with internet is the tether device and regardless of any improvements on power consumption, the transmitter of the wireless device with internet is active is many times even when no devices are nearby that need any internet which is an unacceptable amount higher power consumption then in PCT/GB2016/050241 where the wireless device with internet is only in receive mode waiting for a request for internet by a nearby device without internet.

Both D2 and PCT/GB2016/050241 have still shortcoming in that power consumption can be reduced even further, because the sleep mode power consumption improvement in the transmit sleep cycles of the wireless device with internet (tether device) of D2 or the negligible power consumption in receive mode only of PCT/GB2016/050241 still don't reduce in any way the power consumption during the actual internet sharing period between wireless devices. The previous shortcoming of D2 is further highlighted by the author of D2 himself, quote "Another minor issue with the multi-client case is the beacon. In our design, a softAP does not send out beacons in the sleep mode. Thus, a new client cannot join the Wi-Fi network when the softAP is in sleep. However, the softAP sends out periodic beacons when it is active. Even in long sleep stage, it still wakes up periodically and can send out beacons. Consequently, a new client is still able to find the softAP but may experience slightly longer latency. As this only happens when a new client joins the network, we think it is acceptable." Unquote. Obviously this shortcoming of D2 is completely unacceptable as a commercial product, and although it's addressed in the novelty of PCT/GB2016/050241 by having the wireless device with no internet transmitting the beacon, this patent will further improve the power consumption of PCT/GB2016/050241 without using anything of D2 as the shortcomings of D2 are not acceptable in way shape or form. A further shortcoming of D2 that this invention will be resolved in the embodiments or claims of this invention is the shortcoming highlighted by the author of D2, quote "if the AP (=access point or tether device) is in the sleep mode, this packet will be lost, even after the retries that occur at the low layers of the network stack. Second, putting an AP to sleep will introduce increased network latency and may impair user experience if the extra latency is user perceivable." unquote.

D3 describes in essence a "distributed incentive model" or quote "mechanism for encouraging users' participation" unquote. Actually D3 relies on the prior art also referred to and explained extensively also in the prior art section of PCT/GB2016/050241, for example of Fon, OpenGarden, as outlined in D3's Introduction: quote "One of the first UPC (user provided connectivity) services was FON [4], a community-based WiFi Internet access scheme, where roaming FON users can access Internet through the home WiFi connections of other nearby FON users. Several novel UPC schemes that leverage the capabilities of user-owned equipment to operate as mobile hotspots have also emerged recently, such as the ones by Karma [5] and Open Garden [6]." unquote.

Further evidence on D3 specific contribution on an incentive method to encourage users to share their internet, and not any novel method nor any novel system at all on how to improve internet sharing, or how to reduce power consumption, or how to reduce radio interference; quote "We design an incentive mechanism, based on the Nash bargaining solution (NBS), that induces users' participation through fair allocation of the contributed resources. This is very crucial to maintain a good performance of the service, Distributed Implementation, We propose a distributed algorithm, which combines the concepts of consistency pricing [11] and primal-dual Lagrange relaxation [12], and achieves the unique NBS. This enables the decentralized implementation of the service without requiring central coordination or additional infrastructure." unquote.

Actually PCT/GB2016/050241 does not rely nor describes any distributed incentive model nor any distributed incentive method nor any such mechanism for encouraging users' participation, so in fact there is no prior art of D3 applicable in PCT/GB2016/050241, however the shortcomings of D3 are addressed and resolved in the embodiments and claims of this invention. D3's shortcomings are mainly in that using a decentralized incentive method of, quote "decentralized implementation of the service without requiring central coordination or additional infrastructure" is helpful in that it's decentralized but unfortunately without additional infrastructure means that that whatever the incentives are the only way to account for the incentives or "consistency pricing" can only be communicated between users of such incentive system in a peer-to-peer manner. Unfortunately the shortcoming of not using any kind of central coordination or additional infrastructure but rather only the devices themselves, results in practical terms that any accounting at the end of an internet sharing session can't be done peer-to-peer because devices are no longer connected to each other and may never be in the future or at a later stage in the future (days or weeks later). Also even in the unlikely event that user devices interconnect and he previous transaction incentives can be accounted for, still the current transaction can't be done at the end of the session or as happens often with wireless devices, the software APP running such incentive scheme may crash and all information is lost. The current patent novelties will address and resolve this shortcoming too in its embodiments and claims of the present invention.

D4 is the prior art publication of 2009 with title "Cool-Tether: Energy Efficient On-the-fly Wi Fi Hot-spots using Mobile Phones" by Sharma et al. and it describes in essence, quote "methods for energy-efficient on-the-fly WiFi hotspot implementation using mobile phones." D4 actually states, quote "A common solution adopted today is to use the tethered mode operation of mobile phones, allowing a dedicated phone to be used as a modem to provide connectivity to another device." unquote. So just like D1 to D3, also D4 is using the tether function feature of the device, meaning the beacon is from the wireless device with internet. This is the opposite of what prior art PCT/GB2016/050241 uses, namely the beacon is from the wireless device without internet and not from the device with internet as in D1 to D4.

Furthermore nor PCT/GB2016/050241 nor this invention require the use of any server on the cloud or proxy on the cloud or the use of a laptop (PC) sending beacons and staying awake to reduce any power consumption nor to connect nearby wireless devices to share internet. The previous is supported by the following quotes from D4, also referred to as Cool-Tether: Quote ". Thus, Cool-Tether employs a proxy in the cloud that first gathers all necessary data before commencing a bursty transmission over the WAN link. The key insight is that for maximum energy efficiency, the radio should be used for as long a burst as can be sustained at the full data rate." unquote.

Quote "Unlike the traditional infrastructure-based 'WiFi setting where the access point serves as the gateway to the external network, in Cool-Tether, the mobile phone WiFi clients serve as the gateway. Thus, the burden of sending beacons and staying awake is borne by the laptop while the mobile phones operate in low-power WiFi adaptive Power Save Mode (PSM), switching to active mode only when there is traffic." unquote.

Quote "The energy-aware-balanced policy is designed to stripe data across phones such that the skew in the battery levels of the phones are minimized. Periodically, say every 30 seconds, a cloud-based striper learns the remaining battery percentage for all phones. It then eliminates phones whose residual battery life is below that of the phone with the highest battery life by a certain threshold, say 5% of battery capacity. Only the remaining subset of phones are chosen" unquote Quote "The client laptop acting as the AP also runs a proxy to which all client requests are directed. Once a web page request arrives at the proxy running on the AP laptop, it is forwarded on a first-come first-serve basis via a gateway phone to the cloud-based gatherer." unquote Quote "On the other hand, in Cool-Tether's reverse-infrastructure mode, the onus of beacon transmissions and staying awake lies entirely on the laptop client, which acts as the access point, allowing the mobile gateway to conserve energy." Unquote Quote "Cool-Tether is designed with ease of deployment as a key criteria. The WiFi infrastructure model used between the laptops and the mobile phones allows any of the gateway phones to join or leave without affecting the rest of the network." Unquote Quote "However, one key component of Cool-Tether is the need for a proxy server in the cloud that performs pre-fetching and striping. While the proxy server is not strictly essential for functionality, a significant portion of the energy savings of Cool-Tether will not be realizable without a proxy server as part of the infrastructure." Unquote The shortcomings of D4 are very apparent and not acceptable in any commercial product deployment. The need for a laptop and a proxy in the cloud renders D4 not usable in the context of our invention. For D4 to become a global solution it would require laptops spaced globally not further then the distance of the coverage area of standard laptop WiFi tethering, which means hundreds of millions of laptops. Thus the power savings by D4 are irrelevant and not applicable to PCT/GB2016/050241 simply because the shortcomings created by the power consumption reduction result in a solution where the D4 system is not viable and not executable in a real commercial product whereas PCT/GB2016/050241 is applicable in a real commercial product as it doesn't require any millions of laptops, nor does it require a proxy server interaction every short time interval between all wireless device and the proxy server, generating an unacceptable amount of data exchange with the proxy server. In PCT/GB2016/050241 the power consumption reduction in the wireless devices with internet to share is reduced in exactly the same amount as in D4 without any of the shortcomings of D4.

However D1, D2, D3 and D4 nor PCT/GB2016/050241, none of them, resolves the shortcomings of improving or ensuring that: (i) data security and the integrity of the internet data or signalling data is managed, and or (ii) radio interference between nearby wireless devices is managed, and or (iii) power consumption during actual internet data sharing period is managed, and or (iv) Incentive method inherently manages secure and reliable record keeping of the incentives transactions.

BRIEF DESCRIPTION OF THE SEVERAL VIEWS OF THE DRAWINGS

FIG. 2 shows an embodiment of the proprietary Module in the form of a block diagram of an implementation of the present invention, wherein the interfaces between the Proprietary Module and the internal parts of the wireless device are referred to as "Interface logic to wireless device baseband & micro-processor" interface (i1) and "Interface logic to wireless device data—& signalling-transceiver" interface (i2). The switch (b4) is controlled by the internet connection detection signal of the wireless device in which the Proprietary Module is downloaded into. If the wireless device has an internet connection than the switch is set to interconnect data bus (10) to data bus (12) but if the wireless device has no internet connection than the switch is set to interconnect data bus (11) to data bus (12). In this way if the wireless device has an internet connection, than the Proprietary Module only listens through the low power consuming narrow band low output power transceiver of the wireless device, represented by data bus 9 input data. If nothing received all other functions of the Proprietary Module are disabled to reduce power until a request for internet is received from a neighbouring wireless device through data bus 9, after decrypting the payload of bus 9 and resulting in understandable data bus 2 and processed by the Proprietary Module logic in (i1). Then (i1) activates through data bus 3 the wide band low output power radio transceiver on the least interference radio channel at a given output power through data bus 8 and provides the information to the neighbouring device through data bus 2, encrypted in b7 through data bus 9 through the interface logic (i2) to the low power narrow band transceiver to the neighbouring device. Once the neighbouring device is connected to the wide band radio transceiver on the least interference radio channel than the internet communication requests (internet petitions) are received through data bus 7, decrypting its payload through (b6) and passed through switch (b4) through a de-multiplexer (b3) to the corresponding data thread (5) for such internet communication request and the internet response will be received on that same specific thread and returned through exactly the same reverse route from (i5) thread through multiplexer (b3), data bus 10 to data bus 12 to data bus 13, encrypted in (b6) to data bus 7 to through the wide band radio transceiver on the least interference radio channel to the neighbouring device that requested such internet communication request. The firewall & traffic filter are optional, for those cases where an additional layer of security is required by activating a firewall (b5) between b6 and b4. The firewall logic functioning as a standard firewall but with the novelty in the form of the following embodiment; filtering the packets received from (b6) and only allow them to pass to (b4) if the domains in the requests are allowed, thus blocking any non-authorised internet access requests. If the wireless device had no internet connection than it would request for internet access through data bus 2, encrypted in (b7) to data bus 9 through the low power narrow band transceiver of the wireless device to the neighbouring wireless device with internet connection. Once it receives the information through the low power narrow band transceiver of the wireless device (bus 9 through b7 to bus 2 to i1) than i1 connects to the 3 the wide band radio transceiver on the radio channel it received through the low power narrow band transceiver. The Proprietary Module than sets the parameters of the Proxy on a given port number and assigns an IP address, send the internet request from data bus 4 through proxy (b2), through switch (b4) from bus 11 to bus 12 to bus 13 (optionally through firewall & traffic filter b5), encrypting the payload towards data bus 7 to the low power narrow band transceiver to the neighbouring wireless device with internet connection. The response follows exactly the same path in reverse from data bus 7 till data bus 4. The "optional incentive logic" (b1) is an optional feature where the incentive algorithms are managed to incentive users of wireless devices to share their internet data and managed through data bus 1 and interface i1 with the rest of the functions of the Proprietary Module.

FIG. 3 is a flow chart implementation of a method of the present invention with respect to the interface logic (i1) and (i2) of FIG. 2, and interacting between the functions of the wireless device and the functions of the Proprietary Module of the DISTRIBUTED INTERNET SHARING SYSTEM (DISS) of FIG. 1, referred to in FIG. 3 as "DISS" method flow chart.

FIG. 4 is a flow chart implementation of a method of the incentive scheme of FIG. 2 of the present invention with respect to the optional incentive logic (b1) interacting with the functions of the wireless device and the functions of the Proprietary Module of the proprietary DISTRIBUTED INTERNET SHARING SYSTEM (DISS) of FIG. 1, referred to in FIG. 4 as "DISS" incentive scheme flow chart.

DETAILED DESCRIPTION OF THE INVENTION

Figure 1:
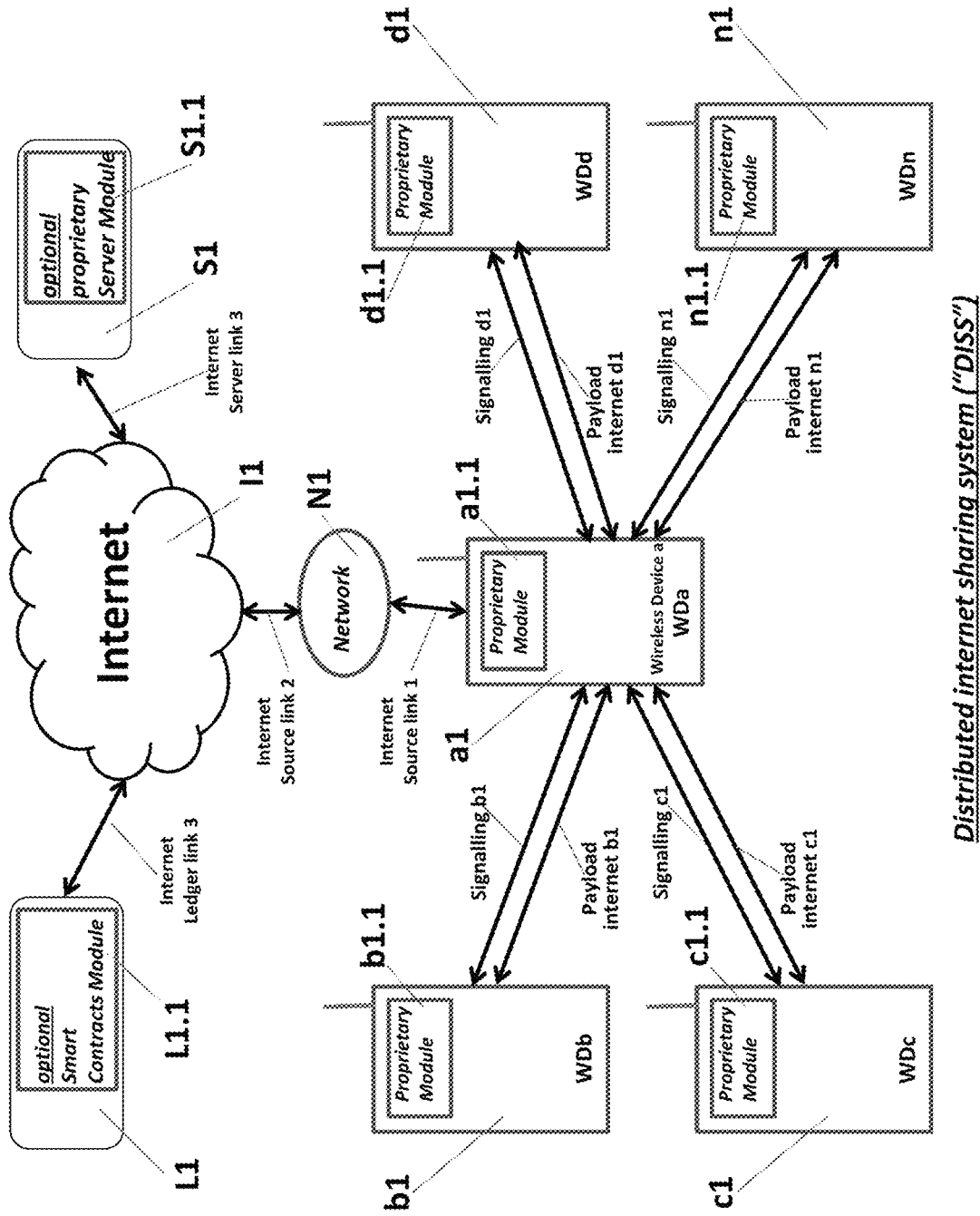
FIG. 1 represents a typical embodiment of present invention system, DISTRIBUTED INTERNET SHARING SYSTEM (DISS) where the novelty is represented in FIG. 1 jointly by a1.1, b1.1, c1.1, d1.1 and n1.1 and optionally including s1.1 and/or L1.1. As an example; wireless device WDa (FIG. 1. a1) has a direct internet connection whilst WDb (FIG. b1), WDc (FIG. 1. c1), WDd (FIG. 1. d1) and WDn (FIG. 1. n1) do not have any direct internet connection respectively. All wireless devices have a downloaded Proprietary Module or also referred to as Software Module of this invention, such that a wireless device without any direct Internet connection through its downloaded Software Module of this invention can communicate directly and automatically with other neighbouring wireless devices with a downloaded Software Module through a signalling channel (Signalling b1, Signalling c1, Signalling d1 and Signalling n1). The signalling channel then exchanges information between neighbouring Proprietary Modules of each wireless device. The Proprietary Module of the wireless device with direct internet connection establishes a different to the previous ultra low power narrow band Signalling channel, namely a direct communication channel with the wireless device that requested internet. Such internet is shared through the wireless device with direct internet connection (WDa) Proprietary Module (a1.1) say for example with WDb, through the communication channel (Payload internet b1) through proprietary Module (b1.1) allowing internet access to WDb. Similar is applicable if WDc and/or WDd and/or WDn request an internet connection through WDa than each will connect to WDa respectively and receive their respective payload internet; Payload Internet c1, Payload Internet d1, Payload Internet n1.

Specifically, FIG. 1 is a top-level block diagram of a communications system in accordance with the present invention. It includes wireless devices and optionally data processing and storage servers interconnected and communicating with each other through the Internet wirelessly. It also shows the overall basic functionality, with respect to the proprietary DISTRIBUTED INTERNET SHARING SYSTEM (DISS) of this invention, wherein the novelty lies in the combination of the Proprietary Module downloaded into Internet enabled wireless devices that then makes such software module operable. The DISS can incorporate optionally a proprietary Server Module embedded into a server connected to the Internet and accessible by the wireless devices through a downloaded Proprietary Module or also referred to herein as Software Module of the present invention. The DISS can incorporate additionally an optional Smart Contracts Module embedded into a server or Ledger connected to the Internet and accessible by the wireless devices through a downloaded Software Module of the present invention. The function of the "Smart Contracts" (see L1.1 of FIG. 1) in the Ledger Server (see L1 of FIG. 1) is to store and process in a Blockchain environment the transactions between Proprietary Modules which could as part of an incentive scheme to share internet be trading Mega Bytes of internet data for a certain amount of Tokens (see FIG. 4 more detailed description). Also L1.1 can securely store the wallets with the settled trading amounts credited or debited and final balance and the personal data of each Proprietary Module wireless device users'. The function of the "Proprietary Server Module" (see S1.1 of FIG. 1) in the traditional Server (see S1 of FIG. 1) can be to perform all the previous mentioned functions of the Ledger Server, thus not requiring a Ledger server in a Blockchain environment or alternatively when a Ledger Server L1 is used, then the functions of S1 are those functions that do not require any Blockchain environment, such as for example but not limited to store and process user behavior data and any such other data extracted through the wireless devices' Proprietary Modules that will be used for improving the marketing of customer retention schemes and to lower the cost of acquisition of new users as well as to increase the advertizing revenue.

As a matter of illustration to help better understand how FIG. 1 DISS works, let's make the following assumptions:

Wireless Device a to n (a1, b1, c1, d1 and n1) each have downloaded the Proprietary Module or Software Module (a1.1, b1.1, c1.1, d1.1 and n1.1 respectively) of this DISS invention. All devices are within proximity of each other for this example.

Wireless Device b1, c1, d1 and n1 are smartphones or tablets with or without a valid SIM, Wireless Device a1 is a smartphones or tablets is in one use case with valid SIM connected to the internet through a Mobile Network and in a different use case without a valid SIM connected to the internet through a WiFi Network.

Wireless Device a (WDa or also referred to as a1) has a wireless data connection (Internet Source link 1) to the internet (I1) through his home WiFi or a public WiFi or his Mobile Network Operator (N1).

Wireless Devices b to n (WDb, WDc, WDd and WDn or also referred to as b1, c1, d1 and n1) have no internet connection.

Network (N1) is a private or public hotspot/access point typically using the WiFi technology but not limited to WiFi, or is a cellular/mobile network operator infrastructure typically using the GSM technology but not limited to GSM. Other technologies that the Network (N1) could use, but not limited to, are NFC (near field communication), Bluetooth, WiFi 802.11a to WiFi 802.11ax/ay, WiFi 802.11-2016 and further years variants, WiMax, GPRS (general packet radio service), PCS (personal communications channel), GSM (global system for mobile communication), GSM 2G, GSM 2.5G, GSM 3G, GSM 4G, GSM 5G, LTE, CDMA, WCDMA or any such other current or future wireless radio technology.

Wireless Devices with a downloaded Proprietary Module or also referred to herein as Software Module of this invention can share their internet with other Wireless Devices with a downloaded Proprietary Module. Furthermore Wireless Devices with a downloaded Proprietary Module can communicate with the Server Module (S1.1) and/or Smart Contracts Module (L1.1), respectively embedded or downloaded on server (S1) and Ledger (L1) or also referred to in the industry as Ledger Server or Blockchain.

A dictionary definition of Blockchain is "A digital ledger in which transactions made in a crypto-currency are recorded chronologically and publicly."

A dictionary definition of Blockchain is "Bookkeeping; an account book of final entry, in which business transactions are recorded."

As a matter of illustration a first use case is explained, where the wireless device a (WDa) is connected to the internet through a WiFi access point, through "Internet Source Link 1" through WiFi access point Network (N1). Wireless device b (WDb) who has no internet connection, because he has no mobile data credit or has no SIM or doesn't have the WiFi password or outside of the WiFi coverage area but within range of WDa. Than WDb (b1) through its Proprietary Module (b1.1) transmits through "the low power consuming narrow band low output power transceiver" (LPNBTX) of WDb requesting to get internet access from WDa (a1).

Such "LPNBTX" can be but is not limited to an NFC (near field communications) or a BLE (Bluetooth low energy) or any such other ultra low power consuming transceiver operating a very narrow band transmission medium. In this example we assume the use of the BLE which is so ultra narrow band (1 to 2 MHz bandwidth) that only allows transmissions of several bytes per transmission frame, such as for example a maximum of 15 bytes or data speeds caped at maximum 1 Mb/s (where Mb/s stands for Mega bit per seconds). Maximum transmitter power is 10 mW. Furthermore the BLE standard is very robust in that it performs frequency hopping and thus more resilient to radio interference from other radio source and from other WiFi transmitter, Bluetooth transmitters (is wide band compared to BLE), and any such other transmitting in the same frequency band where BLE is allowed to operate in. Currently BLE as is the case for Bluetooth are allowed to operate in the 2.4 to 2.4835 GHz band which is also used by WiFi, depending on the region from channel 1 (2.412 GHz) till channel 14 (2.484 GHz). BLE allows for maximum 7 slaves; that could result in a peak consumption of 15 mW according to some specifications on BLE devices. This power consumption shortcoming is addressed and resolved in an embodiment of the present invention this number has been reduced to 4, allowing only 4 devices to connect to a same BLE, in order to reduce the power consumption further downwards in the amount of 4:7=0.57 times lower.

A further issue is that the radio channels 12 to 13 are not allowed to be used by Bluetooth, BLE or WiFi in the United States of America (USA), whilst channel 14 is not allowed to be used in Europe. This limitation is implemented in most if not all industrial or commercial wireless devices as smartphones, tablets and access point, hotspots, etc. In the form of limiting the use only of the common allowed channels globally, meaning operate only on channels 1 to 13 which is the lowest common nominator coinciding with the USA allowed 2.4 GHz band channels. This unfortunately penalizes the rest of the world outside of the USA, by reducing the amount of channels thus reaching saturation of the 2.4 GHz band more often in crowded areas where multiple wireless devices operate and operate in the same frequency band. This inefficient use of all the channels in the 2.4 Ghz band shortcoming is addressed and resolved in a different embodiment of the present invention this use of the channels per region is resolved as follows; detecting the region where the wireless device is operating in without using the high power consuming GPS (global positioning system) module and without requiring a direct internet access at the moment this info is required by the Proprietary Module of the present invention. This is obtained in an embodiment by monitoring the past historical internet domain searches after a power on of the device or after an exit of flight mode of the wireless device. When a domain such as but not limited to google.com was detected than the response is used to determine the country or region of the actual last used internet connection. If such past domain response was not available or not recent enough than the Proprietary Module (a1.1) of WDa (a1) with a direct internet connection will request for example an https://google.com internet communication request (internet petition) and the response will be analyzed as to extract the country/region from an internal table mapping. As a matter of illustration, if the response has in the redirected received URL address (uniform resource locator or in other words the address of a world wide web page or simply an internet address) somewhere the following content "google.co.jp" than the country where the wireless devices WDa connects to the internet is Japan, but if the response includes "google.be" than the country is Belgium in Europe. However if "google.com" detected by the Proprietary Module of WDa is in the response URL than that is considered as an internet access through a USA internet connexion or any such regional/countries domain owned by Google Inc.

A real life different example WDa (a1) Proprietary Module (a1.1) making an internet to https://www.google.com and receiving this real test response https://www.google.com.gi/?gws_rd=cr&dcr=0&ei=ahsPWqCdCIKla-XkmpAN_ and when the Proprietary Module (a1.1) compares all the Google inc. owned domains and corresponding country table, finds only one match with "google.com.gi/" meaning the country from where the internet was accessed was Gibraltar.

This is the complete list of all domains owned by Google Inc as extracted on 17 Nov. 2017 from the internet from thus URL: https://ipfs.io/ipfs/QmXoypizjW3WknFiJnKLwHCnL72vedxjQkDDP1mXWo6uco/wiki/List of Google domains.html With the country or region now fully resolved, our invention in this embodiment when the region/country detected is the USA, limits the number of channels used by any of the wireless device non-cellular or non-mobile transceivers, for example but not limited to Bluetooth, BLE, WiFi, WiFi-Direct, will be channel 1 to including channel 11 in the condition that the wireless devices WDb, WDc, WDd and WDn connect to WDa operating in the 2.4 Ghz band. If however the region/country detected is Japan then channels used on the 2.4 GHz will be channel 1 to including channel 13 whilst in the event of WiFi 802.11b additionally channel 14 will be allowed. If however the region/country detected is not USA and not Japan then channels used on the 2.4 GHz will be channel 1 to including channel 13.

Alternatively in a different embodiment the if the region/country detected is not USA, meaning not detecting "google.com" nor "google.com/", excluding any URL response with "google.com." where the extra dot refers to other countries different then the USA anyway such as "google.com.ar" for Argentina or "google.com.au" for Australia and so forth, then channels used on the 2.4 Ghz will be channel 1 to including channel 13. This last improves outside of the USA, for the rest of the world, the radio interference robustness of this invention compared to the prior art in the amount of 13:11=1.18 times (an increase of 18% more robust to radio interference) and the same amount f 1.18 times increasing the statistical limit when saturate of all the channels would be reached and consequently the same 1.18 times increase of the number of wireless devices users in the same are before saturation of all channels is reached.

A further benefit of using this proprietary method to detect the region/country to which the wireless is connected to the internet rather than the GPS location country or SIM connected mobile network country code, is the following: SIM connected mobile network is not accessible in iOs devices (iOs being the operating system from Apple Inc) and even if available in Android devices (Android being the operating system from Google Inc), the network country may not be at all the true country where the wireless device user is when in areas close to country boarders. Actually mobile networks connections to wireless devices can be in some case >10 km into the neighbouring country thus provided in a band of 10 Km on each side of country boarders potentially the wrong country/region when a wireless device is connected to a local WiFi source in say along the Canada border whilst connected to the USA home Mobile Network at the same time obtaining a SIM network country code of USA. This is not acceptable in example along the USA-Canada border or along the USA-Mexico border or around USA offshore territories. As for GPS location in wireless devices the power consumption required is simply not accessible and too slow to accurately define the region/country along border lines.

For completeness, in a different embodiment of the present invention the same method used to manage the allowed channels by the Proprietary Module in the 2.4 GHz band is unimplemented in this invention using the detected country/region as described above and allowing those radio channels on the 5 GHz on a per country/region basis limiting the maximum allowed WiFi-Direct output power depending on the selected channel for each region/country as shown on this URL as viewed on 17 Nov. 2017: https://en.wikipedia.org/wiki/List_of_WLAN_channels#2.4_GHz_.28802.11-b.2Fg.2Fn.29 showing the allowed channel per channel number on each frequency band per country/region and the allowed max output power per channel and allowed use, such as for example channel 36 indoor in USA and Europe but anywhere for China or channel 165 anywhere for USA and Canada but limited in Europe and Switzerland to SRD max 25 mW output power. This same novel method of this invention is applicable to any current or future channels of any frequency band be it for any current or future technology.

In a further embodiment of the present invention the wireless device's BLE radio interface is adapted to operate also in all other different frequency bands where WiFi is allowed to operate on under the same limitations for BLE as for WiFi on each channel and frequency band as to allowed or not, use indoor or different, limitations on max output power, for example operating the BLE on 5 GHz band or any such current or future WiFi frequency bands.

Coming back to the step where left off before we explained the BLE and so forth, we pick it back up at the point where WDb (b1) through its Proprietary Module (b1.1) transmits through "the low power consuming narrow band low output power transceiver" (LPNBTX) for example through the BLE (Bluetooth low energy) transceiver of WDb requesting to get internet access from WDa (a1). Wireless Device WDa (a1) with internet then responds back through its Proprietary Module (a1.1) through the BLE transceiver of WDa (a1) back to the BLE of WDb (b1) to the Proprietary Module (b1.1).

The information send by WDb Proprietary Module (b1.1) to WDa Proprietary Module (a1.1) through both their BLE transceivers is, but not limited to, indication WDb request internet, WDb has 2.4 GHz only, has also 5 GHz WiFi transceiver or not, value of radio signal strength it receives from the responding device defined as RSSI level (radio signal strength indicator expressed in dBm which is the power ratio in decibels as reference to 1 milliwatt), number of channel 1 to 14 with the first the lowest interference meaning the most negative RSSI followed by the rest in order from most negative to least negative dBm value, optionally has credit yes or no, optionally amount of credit.

The information response by WDa Proprietary Module (a1.1) to WDb Proprietary Module (b1.1) through both their BLE transceivers is, but not limited to, indication WDa can share internet yes or no (meaning WDa has less than 4 connected devices, password and ESSID (extended service set identifier) or SSID (service set identifier) or BSSID (basic service set identifier) of WiFi-Direct of WDa, region/country of internet connexion of WDa.

For the avoidance of doubt, in a different embodiment of the present invention, the wireless device with internet WDa (a1) when not in range of any wireless device that requests internet is strictly in receive mode only in order to further reduce power consumption of the wireless devices with internet connection. Typical tests made by the inventor in an average week (7 days usage) the time connected to the internet considering going about the normal life, travelling to and from places, being at meetings or at work, typically home after 20H and sleeping from 24H to 7 h30. This resulted in similar values for week days but very different for weekend days and average over the 7 days gave 20% of the time without any internet connexion (neither mobile data nor WiFi connection). This was with a smartphone Samsung S6 with a valid SIM and with plenty of WiFi passwords of the usual places as home, restaurants, meetings rooms etc. This last, in the opinion of the inventor of this patent is representing a best case scenario. For smartphone use by younger users this percentage of no internet connexion is above 50% due to their mobile credit expiring before the end of the month and for smartphone users of developing countries this figure is expected to be even higher than 80% due to the fact that the cost to access the internet is simply not affordable or often have to walk to specific distant locations to their home where they can connect to WiFi access points. Actually according to a 2016 World Economic Forum press release with title "This is how to add $6.7 trillion to the global economy" it states quote "Bringing the internet to the 4 billion people not currently online would add $6.7 trillion to the global economy and lift 500 million people out of poverty, new research has found" un-quote.

The previous embodiment means that the power consumption of the present invention, compared to the prior art, can be reduced depending on the three use cases explained previously between 20% worse case, 50% or best case 80% of the consumption of "the low power consuming narrow band low output power transceiver" (LPNBTX) of the wireless device with internet WDa (a1).

In an embodiment of the present invention all the payload data exchanged through Signalling channels between wireless devices is encrypted as an additional data security protection, for example with a 256 bit AES encryption decryption of the payload. This is done on top of the security the BLE Bluetooth standard provides such as for example typically an 128-bit AES encryption decryption with Counter Mode CBC-MAC, adaptive frequency hopping, lazy acknowledgement, 24-bit CRC, 32-bit Message Integrity Check. This means that a double encryption is provided in an embodiment of this invention of any data exchanged through the FIG. 1 "Signalling b1".

At this point after having exchanged the previous mentioned info between WDa and WDb through the BLE transceiver shown on FIG. 1 through "Signalling b1", at the same time as the WDa sends the response to WDb, than WDa Proprietary Module (a1.1) activates "the wide band low output power radio transceiver" (LPWBTX) for example but not limited to activates the WiFi-Direct of WDa on the less interfering radio channel be it on 2.4 GHz, 5 Ghz band or any future WiFi band available at both wireless devices WDa and WDb and set at the output power equivalent to a lookup table in the Proprietary Module (a1.1). The output power is extracted from a look-up table rating the RSSI value range received from (b1.1) to a given output power of the WiFi-Direct radio transmitter of WDa ensuring proper signal reception by WDb WiFi receiver. For the avoidance of doubt, if the RSSI level (b1.1) provided to (a1.1) was very high like for example would be higher then −50 dBm (i.e. −30 dBm is a lot higher than −50 dBm) than the output radio power of WDa would set by (a1.1) to the minimum level thus reducing the power consumption during the actual internet data sharing period dramatically when those users are close. During the tests performed by the inventor of this patent when wireless devices were within line of sight outdoors or in the same room when indoors, reducing the output power of the WiFi-Direct transceiver resulted in 4 times less percentage of battery consumption compared to not reducing the power level which the wireless devices set to maximum as default. Than the WDb upon receipt of the double encrypted ESSID or SSID or BSSID with the corresponding password proceeds and instantly upon decryption the Proprietary Module (b1.1) instructs the "the wide band low output power radio transceiver" (LPWBTX) for example but not limited to activate the WiFi of WDb in case t wasn't already active and instructs it to connect to the corresponding ESSID or SSID or BSSID with the corresponding password. In a different embodiment the WDb Proprietary Module (b1.1) will use the RSSI it received from (a1.1) to set the WiFi output power level as extracted from a look-up table where certain RSSI range correspond to a certain output power level. The wireless connection of "the wide band low output power radio transceiver" (LPWBTX) in encrypted on transmit side and decrypted on receive side of each wireless device, for example but not limited encrypting the WiFi-Direct data by (a1.1) before presenting it to the WiFi-Direct for transmission and decrypting the data by (a1.1) after receiving it from the WiFi-Direct receiver. The same is true for the (b1.1) decrypts WiFi data received and encrypts data provided to be transmitted by the WiFi transceiver.

In this embodiment of the present invention the actual internet data shared from WDa to WDb and the internet communication requests (internet petitions) from WDb to WDa through FIG. 1 "Payload internet b1" is encrypted and decrypted by the WiFi standard applied by the wireless devices, such as for example 128-bit WPS/WPA-2 security and uses encryption standard (AES)-CCMP as cipher & TKIP, and a randomly generated Pre-Shared Key (PSK) for mutual authentication.

However to increase further the data security this embodiment additionally encrypts and decrypts the payload between the (a1.1) WiFi-Direct (of WDa and the (b1.1) WiFi of WDb, see FIG. 1 "Payload internet b1" with a 128 bit AES (advanced encryption standard) and optional security by (b1.1) only allowing secure internet communication requests (internet petitions) in "https" (Hypertext Transfer Protocol Secure) and optimally make use of a firewall after the FIG. 1 "Payload internet b1" received data decryption in (a1.1) or (b1.1).

Further security is provided in a different embodiment of the present invention by the use of a proprietary proxy in the Proprietary Module of wireless device that requested internet access, in our example WDb in (b1.1).

In a different embodiment of the present invention the wireless connection used to actually share internet data is achieved from the internet source WDa (a1.1) and provided by the WiFi-Direct hardware available in WDa (a1) and functioning as an Access Point to which the WDb (b1.1) connects to as a normal WiFi. Using the WiFi-Direct with the Proprietary Module (a1.1) means this invention never makes use of the tethering or personal hotspot function of WDa, thus the Mobile Network Operator has no control of the proprietary access point of this invention even if the internet source of WDa is mobile data through a valid SIM.

For completeness, once a wireless device that requested internet WDb (b1.1) is connected to the internet through the wireless device WDa (a1.1) that has internet source, the BLE of the WDa can be switched off during the connection time period of "Payload Internet b1" wireless WiFi link. The WDa proprietary module (a1.1) is capable f handling sequential connections through BLE to the different wireless devices that also request internet access, such as next allowing (c1.1) through WDc to connect to (a1.1) and receive internet access, say than after allowing (d1.1) through WDd to connect to (a1.1) and also receive internet access, than after as last to allowing (n1.1) through WDn to connect to (a1.1) and also receive internet access. Any further wireless devices that may request internet access to WDa (a1.1) once 4 are connected are rejected at the BLE info exchange level, in which case in a different embodiment of the present invention such wireless device say number (WD5) or more (WDx) would receive through "Signalling b1" an indication that the maximum allowed connection limit set by the (a1.1), for example to four, has been reached and that they should request internet connection to one of the four already connected wireless devices (WDb, WDc, WDd, WDn). Say for example WD5 through its Proprietary Module interacts through BLE with the Proprietary Module (b1.10 of WDb. Than the process is exactly the same as described previously except that now WDb is an internet source and activates its WiFi-Direct taking into account the info it received through BLE from WD5 and than WD5 connects as a normal WiFi using the connection info it received through BLE from (b1.1) of WD5.

For the avoidance of doubt, WD5 cannot share its internet with any further devices, and the same limitation of only allowing four wireless devices to connect and obtain internet from WDb applies here too. The distributed internet sharing system (DISS) of this invention as depicted in FIG. 1 is not a mesh system and cannot function as a mesh system. The levels of internet sharing is limited therefore to max 2 levels, meaning the original internet source wireless device connected to mobile data or WiFi access point and a first level of max four wireless devices connected to it directly and then a second level of max four wireless devices connected indirectly through a first level wireless device. In practical terms the embodiment of this present invention maximum number of wireless devices that can obtain for a single wireless devices original internet source is 4×4=16 wireless devices maximum. This is done one to reduce power consumption and secondly to ensure a reasonable internet access speed for all wireless devices. For example if the wireless device with original internet source WDa (a1) has say a 20 Mb/s internet connection (be it mobile data or WiFi), then the first level four devices would obtain internet speed at each wireless device (WDb, WDc, WDd, WDn) of 40:(1+4)=10 8 Mb/s. The second level four wireless devices, such as WD5, WDx . . . would receive 8:4=1 Mb/s internet speed.

In a different embodiment of the present invention the internet access to the source device WDa is limited by the Proprietary Module to four and no second level of further downstream internet sharing is permitted when a higher quality level is required, meaning less process power means less battery consumption by all of the four connected devices (WDb, WDc, WDd and WDn) as they don't have to process any further internet connections processing through their respective Proprietary Modules (b1.1, c1.1, d1.1 and n1.1) and additionally the internet speed by the wireless devices obtaining internet access is higher. Of course the internet speed when having less wireless devices connected is higher, such as for example only having one WDb connected to WDa means internet speed at WDb (b1.1) is for example 40 Mb/s of WDa so 40:(1+1)=20 Mb/s internet speed at WDb.

Use cases where two levels of connectivity could be provided is for example in developing countries, where the number of smartphone users connected to a single source in a given are, say for example maximum sixteen, is more important than reducing the power consumption even further or internet data speed reduction is acceptable or where extending the radio coverage range from the internet source from the wireless device with direct internet connection WDa is important to potentially quadruple the distance of connectivity. The radio coverage could be potentially double the coverage distance by $1_{st}$ level connected wireless devices such as WDb and doubted again by $2_{nd}$ level connected wireless devices such as WD5 but no further extension is practical in real life due to previous mentioned restrictions of increased power consumption and reduces internet speeds to unacceptable levels beyond a 2nd level. Thus in practical terms outdoors in line of sight outdoors, radio coverage extension could be increased by the wireless device source WDa towards WDb at a distance of around 70 meters according to tests in outdoor urban areas performed by the inventor o this patent but could be up to 200 meters according to some publications and consequently the same distance from WDb to WD5, achieving a maximum internet connectivity range to the last wireless devices WD5 at around 140 to 400 meters from the wireless device WDa.

Therefore this DISTRIBUTED INTERNET SHARING SYSTEM of the present invention does not function in a mesh topology but then again this invention does not make any claim or any embodiment reference to any mesh topology or mesh use in any way whatsoever.

Figure 2:
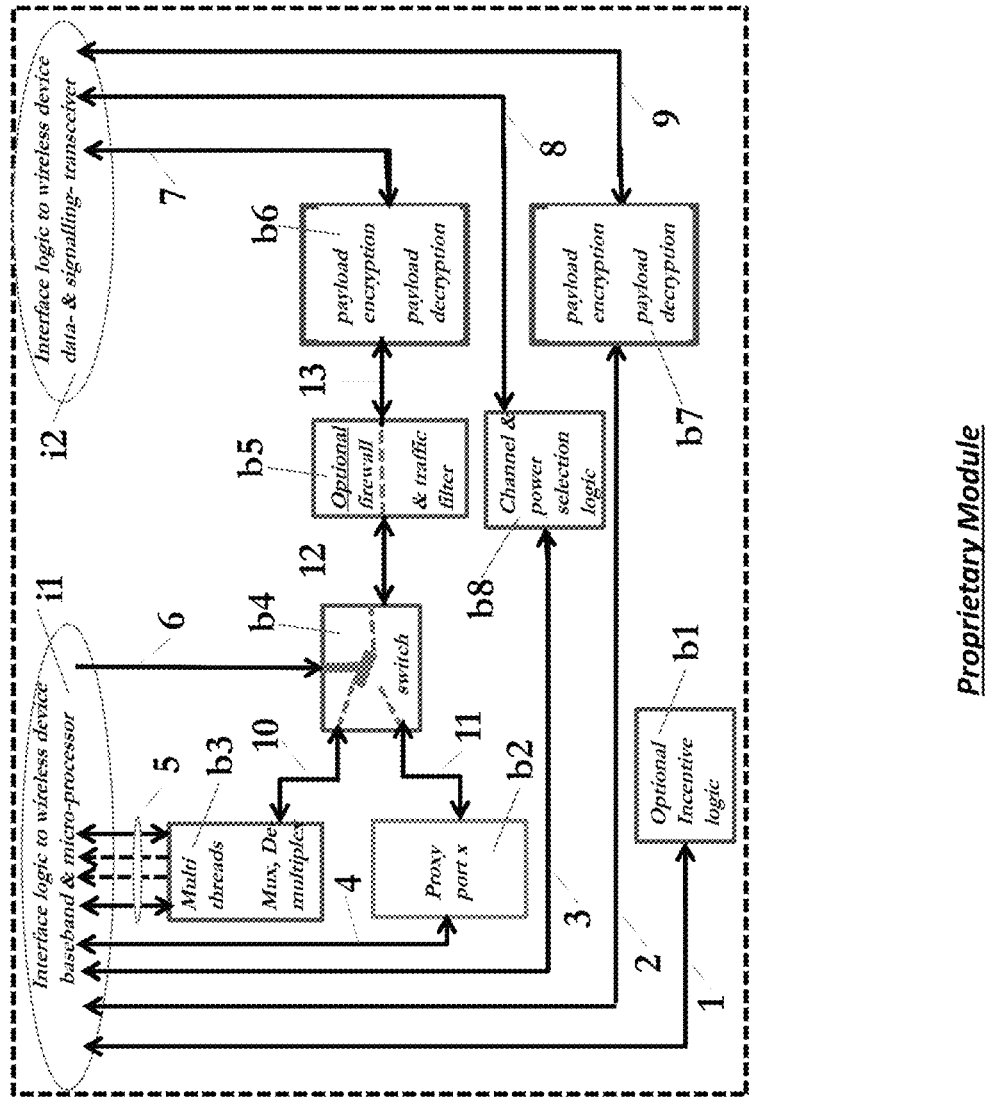
FIG. 2 shows a representation of the Proprietary Module of previous FIG. 1 of the present invention with respect to the proprietary DISTRIBUTED INTERNET SHARING SYSTEM (DISS).

FIG. 2 is a representation of a typical embodiment variant of the "Proprietary Module" of this invention. This Proprietary Module is downloaded onto wireless devices that then form the DISTRIBUTED INTERNET SHARING SYSTEM (DISS). It is important to note that; the present invention through the Proprietary Module of FIG. 2 does not interfere, filter, intercept or alter any internet communication requests (internet petitions) originated by the user of the wireless device with a direct internet connection. A wireless device with direct internet connection would be for example FIG. 1 WDa (a1) and its corresponding FIG. 1 Proprietary Module (a1.1). This invention however does intercept, filter or alter internet communication requests (internet petitions) originated by the user of the wireless device with no direct internet connection. A wireless device with no direct internet connection would be for example FIG. 1 WDb (b1) and its corresponding FIG. 1 Proprietary Module (b1.1). Therefore FIG. 2 is better understood when starting from the "Wireless device baseband & micro-processor" interface logic, see FIG. 2 (i1) detecting a trigger from the wireless device indicating the wireless device has no internet connexion, see FIG. 2 (6). In a different embodiment f the present invention "no internet" trigger indication (6) is activated by interface logic (i1) when the wireless device indication of connectivity state changes to not connected AND by (i1) sending an internet communication request (internet petition) to a server domain that uses inherently regional domain server (such as for example to https://google.com) and if no response within a predefined time period than no internet is confirmed AND the wireless device is not connected to a nearby wireless device with a Proprietary Module, for example not connected to a WiFi-Direct with the SSID, ESSID, BSSID and password provided by the Proprietary Module of this device. The previous internet communication request (internet petition) is performed optionally by the Proprietary Module at regular time intervals, for example every 10 minutes or 30 minutes to force a no internet regardless of any other condition if the previous state was yes direct internet connection. The no internet indication signal (6) then sets the switch (b4) to interconnect the internal data bus (11) to internal data bus (12).

Than the Proprietary Module of FIG. 2 continues with the next step, namely to activate and configure through the interface logic (i1), through the internal data bus (2) the low power narrow band transceiver, for example activating and configuring the BLE transceiver.

At this point in time the Proprietary Module will encrypt the payload in the encryption/decryption block (b7), wherein the payload is the data from internal bus (2) and passed on encrypted through internal bus (9) through the interface logic (i2) to the BLE transceiver. In a different embodiment of the present invention such payload is, but not limited to, has only 2.4 GHz band for following listed transceivers, has also 5 GHz for following listed transceivers, has other additional frequency band(s) for the following transceivers, the less interfering channel number with the lowest RSSI levels in order from most negative to less negative, need an emergency connection provoking to ditch one at the nearby device if at full capacity to free space to connect this device in highest priority.

If the BLE transceiver does not receive any response, than that means that there are no wireless devices with a built-in Proprietary Module within radio range OR that there none of the wireless devices with a built-in Proprietary Module in radio range can share their internet for whatever reason, for example the BLE of the nearby wireless device is switched off or at the maximum allowed connections.

Once the BLE receives a response, from a nearby Proprietary Module through the wireless device where it is downloaded into, then such received information is passed on by interface logic (i2) through internal bus (9) to de-crypt the payload in the encryption/decryption block (b7), than passed through internal bus (b7) to the interface logic (i1).

Upon receipt of such response than the interface logic initiates two simultaneous steps:
  activating and configuring the proxy (see b2 of FIG. 2) on a given port and assign an IP address. The proxy (b2) will then intercept all internet communication requests (internet petitions) or in other words redirect all outgoing internet traffic from all the wireless device functions through the interface logic (i1) through the internal data bus (4) to the proxy and all the corresponding internet responses will be provided back by the proxy (b2) through internal bus (4) through the interface logic (i1) to each of the corresponding wireless device functions who originated the corresponding internet communication request (internet petition). AND
  activating and configuring through the interface logic (i1), through the internal data bus (3) the low power wide band transceiver, for example activating and configuring the WiFi transceiver or WiFi-Direct transceiver, in the event of no direct internet it activates the WiFi transceiver and in the event of yes direct internet connection it activates de WiFi-Direct. N our case we activate now the WiFi transceiver.

The logic interface (i1) extracts the corresponding information from internal bus (2) and passes it on through internal bus (3) to the "Channel & power selection logic" function (b8) which processes the information and passes it on in the format required through internal bus (8) to configure the WiFi transceiver. Such information is what the nearby devices provided, but not limited to, the frequency band, optionally the radio channel on that frequency band, the output power level of the transmitter, the SSID or ESSID or BSSID for the receiver to connect to, the password of such SSID or ESSID or BSSID. Once the wireless device is connected to the corresponding SSID, a connectivity change indication is from the wireless device at the logic interface (i1). As explained earlier, when a wireless device with no direct internet connection (WDa) is connected to a nearby wireless device (WDb) with a built-in Proprietary Module, or in other words connected to a specific SSID, ESSID, BSSID with the password provided by the Proprietary Module of this wireless devices (WDa) then such internet connection is considered as a non-direct internet connection as its through WDa, meaning internal logic (i1) signal (6) remains as no internet connecting (11) directly to (12).

Once this wireless device WDb (device with no direct internet) is connected through its WiFi transceiver to the WiFi-Direct of WDa (device with direct internet source) then all outgoing the internet communication requests (internet petitions) from all different internal functions of WDb are redirected through logic interface (i1) to internal data bus (4), through proxy (b2), through internal data buses (11) and (12) and (13) to be payload encrypted by (b6) and passed on through internal data bus (7) through logic interface (i2) in the format as expected by the WiFi transceiver as payload data to be transmitted to the nearby Proprietary Module of the wireless device (WDa) with direct internet.

The proxy (b2) in a different embodiment of the present invention can also function to increase security by providing a proxy authentication mechanism as to automatically authenticate only connections between different Proprietary Modules from this invention.

In yet a different embodiment of the present invention, internal data bus (12) passes first through an "optional firewall & traffic filter" (b5) before the processed data is presented to internal bus (13). The internal data (12) is filtered as to, but not limited to discard any none secure internet request meaning any request not containing https and/or any internet request to any URL containing a domain name not in the authorised internal look-up table and/or filter through an additional optional firewall to increase data security.

At this point the Proprietary Module of WDb waits for a response from the nearby different Proprietary Module of WDa, which WDb will present such received data from the WiFi transceiver of WDb through logic interface (i2) through internal data bus (7) to be decrypted by (b6) through internal data bus (13) to internal data bus (12) and through switch (b4) to internal data bus (11) processed by the proxy (b2) and placed as a response through the logic interface (i1) to the corresponding function of the wireless device which made the corresponding communication request (internet petition) in the first place. For clarification purpose, say for example the Proprietary Module is embedded inside a Facebook APP thus forming an integral part of the Facebook APP. Then if a user of such wireless device without direct internet access but with a built-in proprietary module inside the Facebook APP, and connected to a wireless device with a Proprietary Module with direct internet access, makes an internet communication request (internet petition) then the proxy (b2) through the logic interface (i1) provides the response to such internet communication request (internet petition) to the origination function, in this example to the Facebook APP. If however an different internet communication request (internet petition) is originated say by the Instagram APP, then traffic filter (b5) will check against an internal lookup table if domain instagram.com is an allowed domain and if the request contains https and if yes to both then passes such request to the nearby device and the response back through the proxy (b2) and logic interface logic (i1) to the originating APP, meaning to the Instagram APP. In a different embodiment of the present invention this domains lookup table of (b5) is a default local list of allowed domains, such as for example all the domains owned by the company of the APP wherein the Proprietary Module of this invention is embedded into. In the previous example of Facebook embedding our Proprietary Module this list could be, but not limited to, facebook.com, instagram.com, whatsapp.com and/or any of the other more than 60 companies acquired by Facebook as listed and accessed on this internet URL on 27 Oct. 2017: https://en.wikipedia.org/wiki/List_of_mergers_and_acquisitions_by_Facebook The look-up list could additional also include domains not owned by the company who integrates the Proprietary Module of this invention, such as but not limited to the domain of the push notifications process used of the corresponding smartphones (iOs, Android, Samsung or any such other notifications systems) to allow receipt of incoming notifications, push notifications and or internet domains used inside certain APPs such as Facebook linking to third party domains such as for example when watching certain videos in Facebook it could link to a URL of YouTube.com (owned by Google inc) and thus those domains could be also in the look-up table.

The look-up table is defined as the default domains at compilation of Proprietary Module or at the compilation stage of an APP integrating the Proprietary Module, say when compiling for example the Facebook APP.

In yet a different embodiment of the present invention the loop-up table of allowed domains can be updated remotely by receipt of a specific notification informing the Proprietary Module to add or remove certain allowed domains from the look-up table stored locally in a highly encrypted form or instructing the Proprietary Module to go and update the look-up table by downloading the updated look-up table from an optional remote server connected to the internet.

As this same previously described Proprietary Module of FIG. 2 is also embedded in the wireless device with direct internet access (WDa), lets than use the same FIG. 2 to describe that part of the functionality of the Proprietary Module.

When WDa received from WDb a request for internet access together with previously described information (for example, most free radio channels, only 2.4 GHz band, no emergency connection request, etc.) then the Proprietary Module (FIG. 2) of WDa detects direct internet access and thus activates through logic interface (i1) the signal (6) of switch (b4) connecting permanently during direct internet connection period internal bi-directional data bus (10) to internal bi-directional data bus (12).

At the same time as setting the switch (b4) the Proprietary Module of FIG. 2 activates the following two things: wakes-up & configures the low power wide band transceiver (WiFi-Direct) in the wireless device (WDa) with direct internet connection AND at the same time the "Multi threads Mux, Demultiplex" (b3 of FIG. 2) creates & opens a channel interconnection internal data bus (10) and creating a thread per internet communication request (internet petition) (5) it receives.

The WiFi-Direct of WDa without direct internet access is configured by processing the info received from the Proprietary Module of the wireless device (WDb) with no internet connection through de BLE data exchange received through (i2), (9), than decrypted by (b7) passed though (2) to (i1) and processed in (i1) together with the info form WDa itself. Resulting in (i1) passing the relevant configuration data (for example, frequency band and channel number and optionally the output power level value) through (3), (b8), (8) to (i2) configuring the WiFi-Direct of WDa. The internet communication requests (internet petitions) from WDb (without direct internet) are received by WDa (with direct internet) through the WiFi-Direct transceiver of WDa, through the Proprietary Module of FIG. 2, through (i2), decrypted in (b6), (13), optional through (b5) or passed directly to (12), (b4), (10) and to a dedicated thread per different internet communication request (internet petition) (5). The response to the internet communication request (internet petition) follows the same route in reverse, through the corresponding thread that made the internet communication request (internet petition) (5), through the multiplexer (b3), than through (10), (b4), (12), optionally through (b5) or bypassed directly to (13), encrypted in (b6), through (7), (i2) to the be transmitted through WiFi-Direct to the originator of that internet communication request (internet petition) as to the Proprietary Module of the wireless devices (WDb) that had no direct internet access.

As to FIG. 3, it describes another embodiment of the present invention showing an example of implementation of combining FIG. 2 block diagram inside FIG. 1 system but in the form of a flow chart as shown in FIG. 3 "DISS" method flow chart. The flow chart is self explaining with the text inside each box when following the diagram from the starting function (see b1 of FIG. 3) and following the direction of each arrow.

As for FIG. 4, it describes a different embodiment of the "optional incentive logic" of (b1) FIG. 2 of the present invention, showing an example of an implementation in the form of a flow chart as shown in FIG. 4 "DISS" incentive scheme flow chart. It is to be noted that FIG. 4 can function with only or both; the Ledger (L1 of FIG. 1) or the Server (S1). The flow chart is self explaining with the text inside each box when following the diagram from the starting function (see b1 of FIG. 4) and following the direction of each arrow. In a different embodiment of the present invention the incentive logic of FIG. 4 is an integral part embedded into the Proprietary Module of FIG. 2 and forming thus part of the DISTRIBUTED INTERNET SHARING SYSTEM (DISS) of FIG. 1, where in at least one or both optional servers L1 and/or S1 are used and form part of the system of this invention.

The incentive logic (FIG. 4) is restarted (b1) at, but not limited to, each of the power-on of the smartphone or tablet, at each connection confirmation between Proprietary Modules of nearby wireless devices, etc. and is a function same as the rest of the functions of the Proprietary Module that are operational also when the APP wherein the Proprietary Module is integrated or embedded into is in background. Than the logic (b2) follows one sets of the logic if the Proprietary Module detects has direct internet access or a different sets of logic if no direct internet access. For this example let's assume FIG. 4 is in WDa with direct internet access, so (b2) follows the route of (YES) simultaneously or in other words in parallel onto (b3) and (b4). In block (b3) of WDa the logic will store locally per each of the connected users who gets internet from this device WDa, such as for example WDb unique user ID (WDbUID), the WDbUID region/country, WDbUID internet sharing start and stop time & date in a predefined universal format such as for example as CET (central European time) being GMT (Greenwich mean time)+1 hour. When a connected user who gets internet from this device WDa, in example WDbUID disconnects for whenever reason from WDa, then (b5) initiates a timer (for example 30 seconds). Meaning so long one or more users are still connected then (b6) can send all the data of the user that disconnected (for example WDbUID) through (b8) to the Ledger (L1 of FIG. 1) to be executed by the corresponding Blockchain Smart Contract (L1.1 of FIG. 1) as a confirmed transaction and thus credit or add the corresponding amount of crypto money or Tokens to the WDa unique user ID account (WDaUIDA) and debit or remove the same amount from WDb unique user ID account (WDbUIDA) when this user device connects next to (L1), or alternatively instead of to (L1) send it to the Server (S1 of FIG. 1) to be executed by the corresponding Proprietary Server Module (S1.1 of FIG. 1) as a confirmed transaction and thus credit or add the corresponding amount of traditional money or points system to the WDa unique user ID account (WDaUIDA), and debit or remove the same amount from WDb unique user ID account (WDbUIDA) when this user device connects next to (L1).

Going back to (b2) when the answer was (YES) device has direct internet access, then previously the route through (133) was explained but in parallel route (b4) is activated because the user of WDa may have internet but may be below a certain preset minimum level of crypto money or Tokens (when using L1 of FIG. 1) or alternatively the equivalent in traditional money or credit points (when using S1 of FIG. 1). N a different embodiment of the present invention this minimum level can be overwritten and changed by a Smart Contract (L1.1) or by a Proprietary Server Module (S1.1). Despite the fact that user WDa has internet and thus is not consuming any crypto money or Tokens or traditional money or credit points, he is alerted because the only way to obtain or purchase more is through the internet. In a different embodiment of the present invention, users can add more crypto money or Tokens traditional money or credit points by purchasing them through L1 and executing a corresponding Smart Contract L1.1 or by consuming advertising through the internet managed by (b4) and on completion activate the corresponding Smart Contract L1.1 to add the equivalent in crypto money or Tokens to user account (WDaUIDA) in L1 and confirm the transaction at (b8 of FIG. 4) or alternatively on completion of advertising consumption inform the Proprietary Server Module (S1.1) to add the equivalent in traditional or credit points to user account (WDaUIDA) in S1 and confirm the transaction at (b8 of FIG. 4). For completeness when there are no users anymore connected to WDa, then (b7) send the remainder of info, those that were not already send through (b6) before, though (b8) to the Ledger (L1) or alternatively to Server (S1) for further processing and confirm the transactions completed successfully back to (b8) thus updated locally in WDa the user account (WDaUIDA) of this WDa device user through its built-in Proprietary Module.

The rest of flow chart is self explanatory as it basically described the route (b2) when the answer is NO, meaning when the device has no direct internet access (for example WDb of FIG. 1), except in contrast to the previous route of YES it had to manage multiple users, here n route NO there is only one user namely itself that needs to be managed. IN essence it explains how the mega bytes consumed by user WDb are accounted for and debited from account (WDbUIDA) and credited to account (WDaUIDA).

In a different embodiment of the present invention, if only one server is used (Ledger S1 or server S1) and if that server is not accessible for whatever reason such as server down or temporary no internet access or too poor internet connection, than the credit or debit data will be stored locally by the Proprietary Module (a1.1 and b1.1) of each wireless device (WDa and WDb) and will be send by both the device that had internet source (WDa) and by the device that did not have internet source (WDb) at the first next opportunity that each can connect to the Ledger (L1) or (Server S1). Please note that it is possible that say (a1.1) of WDa send his shared data information immediately or minutes later whereas (b1.1) of WDb send the same received internet connection data for megabytes used and fro when to when, etc. hours or days later. In that case the transaction is not confirmed until both have connected at least once after the internet sharing was completed. In this way WDa can receive a confirmation of the crypto currency or Token amount as confirmed credit on his account WDaUIDA both at the Ledger L1 side (or alternatively Server S1 side) and confirmed at the wireless device side too (b8 of FIG. 4), however WDb account WDbUIDA at the Ledger L1 side (or Server S1 side) also confirms through an executed Smart Contract (L1.1) the crypto currency or Token amount as confirmed debit on his account WDbUIDA but only at the Ledger L1 side (or alternatively Server S1 side) and will only be confirmed at the wireless device side too through (b8) of FIG. 4 at the first next opportunity when WDb has direct or indirect internet access.

In a different embodiment of the present invention, the incentive scheme of FIG. 4 allows for different Smart Contracts (L1.1 of FIG. 1) to be activated, such as for example but not limited to, not credit a user account WDaUIDA of a wireless device (WDa) with direct internet access if the wireless device (WDb) that has no direct internet access has not yet consumed the minimum amount of free mega bytes in a given period, for example 100 MB free internet per each different month non cumulative for unused free MB for next month). This means that the same previously mentioned Smart Contract managing the free internet portion between users accounts will not debit user account WDbUIDA until it consumed the amount of free "Mega bytes" (MB) of internet data and from then on automatically trigger a different Smart Contract allowing for user account WDbUIDA to be debited for all MB beyond the free amount of MB.

What is claimed is:

1. A system including a first internet enabled wireless mobile device and at least a second internet enabled wireless mobile device, the first internet enabled wireless mobile device including at least three radio transceivers of which at least one transceiver is an ultra low power narrow band first local area wireless transceiver, at least one transceiver is a low power wide band second local area wireless transceiver, and at least one transceiver is a cellular phone network transceiver, a first non-transitory storage medium, and a first computer program product embodied on the first non-transitory storage medium, the first computer program product executable on the first internet enabled wireless mobile device to communicate with a second computer program product when executing on the second internet enabled wireless mobile device, the second internet enabled wireless mobile device including a second non transitory storage medium, the second computer program product embodied on the second non-transitory storage medium, the second internet enabled wireless mobile device including at least three radio transceivers of which at least one transceiver is an ultra low power narrow band first local area wireless transceiver, at least one transceiver is a low power wide band second local area wireless transceiver and at least one transceiver is a cellular phone network transceiver, wherein a signalling communication uses only the first local area wireless transceiver of each internet enabled wireless mobile device and a data communication uses only the second local area wireless transceiver of each internet enabled wireless mobile device and an internet communication source uses one of the two following options: a the cellular phone network transceiver of an internet enabled wireless mobile device, or a low power wide band second local area wireless transceiver, wherein the first computer program product is executable on the first internet enabled wireless mobile device to operate said signalling communication and said data communication, in cooperation with the second computer program product when executing on the second internet enabled wireless mobile device, automatically, upon download of the first computer program product to the first internet enabled wireless mobile device, and upon download of the second computer program product to the second internet enabled wireless mobile device and, wherein the first computer program product when executed on the first internet enabled wireless mobile device does not use any virtual private network function of the first internet enabled wireless mobile device nor any user accessible tethering or personal hotspot function of the first internet enabled wireless mobile device, and the second computer program product when executed on the second internet enabled wireless mobile device does not use any virtual private network function of the first internet enabled wireless mobile device nor any user accessible tethering or personal hotspot function of the first internet enabled wireless mobile device, and wherein in the event the first internet enabled wireless mobile device has a direct internet data connection and the second internet enabled wireless mobile device has no direct internet data connection, the second computer program product is executable on the second internet enabled wireless mobile device to communicate signalling with the first internet enabled wireless mobile device with internet connection via the signalling communication to the first internet enabled wireless mobile device, using the first local area ultra low power narrow band wireless transceiver of the second internet enabled wireless mobile device, the first local area ultra low power narrow band wireless transceiver of the first internet enabled wireless mobile device, and the second computer program product is executable on the second internet enabled wireless mobile device, and the first computer program product is executable on the first internet enabled wireless mobile device, to provide automatically an internet data connection via the data communication to the second internet enabled wireless mobile device, using the second local area low power wide band wireless transceiver of the first internet enabled wireless mobile device, the second local area low power wide band wireless transceiver of the second internet enabled wireless mobile device; and the second computer program product is executable on the second internet enabled wireless mobile device to establish automatically a bidirectional internet data connection via the data communication, and automatically when the data communication is established between the first internet enabled wireless mobile device and the second internet enabled wireless mobile device then the second computer program product when executing on the second internet enabled wireless mobile device stops the signalling communication putting the first ultra low power narrow band transceiver of the second internet enabled wireless mobile device in only receive mode and allows internet communication requests to be passed on from the second computer program product when executing on the second internet enabled wireless mobile device to the first computer program product when executing on the first internet enabled wireless mobile device to the internet and each received corresponding internet response to each corresponding internet communication request is passed back from the first computer program product to the second computer program product, and automatically when the data communication is disrupted, lost or ended between the first internet enabled wireless mobile device and the second internet enabled wireless mobile device then the first computer program product when executing on the first internet enabled wireless mobile device stops the data communication, putting the second low power wide band transceiver of the first internet enabled wireless mobile device in only receive mode and the second computer program of the second internet enabled wireless mobile device re-starts the signalling communication putting the first ultra low power narrow band transceiver of the second internet enabled wireless mobile device in periodical transmit bursts mode requesting for internet access and, wherein in the event the second internet enabled wireless mobile device has a direct internet data connection and the first internet enabled wireless mobile device has no direct internet data connection, the first computer program product is executable on the first internet enabled wireless mobile device to communicate signalling with the device with internet connection via the signalling communication to the internet enabled wireless mobile device, using the first local area ultra low power narrow band wireless transceiver of the first internet enabled wireless mobile device, the first local area ultra low power narrow band wireless transceiver of the second internet enabled wireless mobile device, and the first computer program product when executing on the first internet enabled wireless mobile device, and the second computer program product is executable on the second internet enabled wireless mobile device to provide automatically an internet data connection via the data communication to the first internet enabled wireless mobile device, using the second local area low power wide band wireless transceiver of the second internet enabled wireless mobile device, the second local area low power wide band wireless transceiver of the first internet enabled wireless mobile device, and the first computer program product when executing on the first internet enabled wireless mobile device, to establish automatically a bidirectional internet data connection via the data communication, and automatically when the data communication is established between the second internet enabled wireless mobile device and the first internet enabled wireless mobile device, then the first computer program product when executing on the first internet enabled wireless mobile device stops the signalling communication putting the first ultra low power narrow band transceiver of the first internet enabled wireless mobile device in only receive mode and allows internet communication requests to be passed on from the first computer program product when executing on the first internet enabled wireless mobile device to the second computer program product when executing on the second internet enabled wireless mobile device, to the internet, and each received corresponding internet response to each corresponding internet communication request is passed back from the second computer program product to the first computer program product, and automatically when the data communication is disrupted, lost or ended between the second internet enabled wireless mobile device and the first internet enabled wireless mobile device, then the second computer program product when executing on the second internet enabled wireless mobile device stops the data communication, putting the second low power wide band transceiver of the second internet enabled wireless mobile device in only receive mode and the first computer program of the first internet enabled wireless mobile device re-starts the signalling communication putting the first ultra low power narrow band transceiver of the first internet enabled wireless mobile device in periodical transmit bursts mode requesting for internet access, wherein the computer program product when executed on the internet enabled wireless mobile device that has no direct internet access configures that wireless mobile device to transmit at regular time intervals internet requests, through the signalling communication channel, and when an acknowledgement is received from an internet enabled wireless mobile device with an executed computer program product with direct internet access, then the internet enabled wireless mobile device that has no direct internet access will transmit through the signalling communication channel the following data: 2.4 GHz band available yes or no bit 1 or 0, 5 GHz band available yes or no bit 1 or 0, . . . , X GHz band available yes or no bit 1 or 0, channel number with most negative RSSI (radio signal strength) value, channel number with second most negative RSSI value, . . . , channel number with Y most negative RSSI value, . . . , and encrypt this data as payload on the signalling communication, and wherein an internet enabled wireless mobile device with an executed computer program product and with direct internet access will decrypt such data and respond to the internet enabled wireless mobile device with an executed computer program product and with no internet access through the same signalling channel with the following data: internet access possible yes or no bit, frequency band and channel number of the data communication channel, password for the data communications channel, ESSID (extended service set identifier) or SSID (service set identifier) or BSSID (basic service set identifier) of the data communications channel, region or country of an internet enabled wireless mobile device with an executed computer program product and with direct internet access, and encrypt this data as payload on the signalling communication.

2. The system of claim 1, wherein each of the first internet enabled wireless mobile device and the second internet enabled wireless mobile device are a mobile phone, a smartphone, a wireless tablet Computer, a MiFi device, or an Internet of Things (IoT) device.

3. The system of claim 1, wherein the first local area wireless transceiver of the first internet enabled wireless mobile device and the first local area wireless transceiver of the second internet enabled wireless mobile device, are ultra low power narrow band transceivers or Bluetooth Low Energy (BLE) transceivers or Near Field Communication (NFC) transceiver or any such future similar ultra low power narrow band local area wireless technology.

4. The system of claim 1, wherein the second local area wireless transceiver of the first internet enabled wireless mobile device and the second local area wireless transceiver of the second internet enabled wireless mobile device, are low power wide band transceivers or Bluetooth transceivers or WiFi transceivers or WiFi-Direct transceivers or any such future similar low power wide band local area wireless technology.

5. The system of claim 1, wherein the cellular phone network transceiver of the first internet enabled wireless mobile device and the cellular phone network transceiver of the second internet enabled wireless mobile device, are cellular phone network transceiver or 2G, 3G, 4G, 5G transceivers or WCDMA transceivers or PCS transceivers or any such future similar cellular phone network wireless technology.

6. The system of claim 1, wherein the computer program product when executed on the internet enabled wireless mobile device that has direct internet access will configure that wireless mobile device to detect the region or country from where the internet enabled wireless mobile device that has direct internet access is accessing the internet so as to allow the computer program product to discard the radio channels per frequency band, which are not allowed when in each specific region or country, detected as follows: by monitoring the responses to the historical internet domains communication requests after a power-on of the device or after an exit of flight mode of the internet enabled wireless mobile device and match against a look-up table of regional domains listed in the computer program product executed on the internet enabled wireless mobile device that has direct internet access, and if no internet communication requests occurred in a pre-programmed time then the computer program product when executed on the internet enabled wireless mobile device that has direct internet access will make an internet communication request to one of the pre-programmed domains that is known to have responses from regional identifiable servers such as for example;

an internet communication request to https://google.com from a specific region or country will get a uniquely identifiable string in the response corresponding to the actual region or country from which the internet communication request was executed from, such as when making previous internet communication request from a Japan internal connection will have the following content somewhere in the response URL string "google.co.jp" which the look-up table will identify as region or country Japan, similar would be in a response "google.be" would be recognized by the look-up table as Belgium, "google.com.gi" would be Gibraltar, google.com.ar" for Argentina or "google.com.au" for Australia and so forth and any such other string matching with the look-up table or a response with string "google.com" will be assigned to region USA, and wherein the look-up table further has a different look-up table per region or country listing the allowed channel number or frequency per frequency band.

7. The system of claim 1, wherein the first local area transceivers, an ultra low power narrow band first local area wireless transceiver, is a Bluetooth Low Energy (BLE) transceiver operating on the same frequency bands as the second the second local area transceiver, a low power wide band second local area wireless transceiver, such as a WiFi or WiFi-Direct transceiver, depending where the least interfering radio channel is found for use for the first local area transceivers, meaning if no channels are found with RSSI levels below a pre-programmed value, for example below −85 dBm on the 2.4 GHz band and yes is found on the 5 GHz band then the channel on the 5 Ghz will be used for the transmitter of the first local area transceivers.

8. The system of claim 1, wherein the first computer program product when executed on the first internet enabled wireless mobile device that has no direct internet access and is connected to a data communications channel receiving internet access from the second computer program product when executed on the second internet enabled wireless mobile device that has direct internet access, will automatically detect if the internet bit rate is equal or higher than 8 Mb/sec and the battery level of the first internet enabled wireless mobile device that has no direct internet access, then the first computer program product when executed on the first internet enabled wireless mobile device auto reconfigures configures itself and acts as a first computer program product when executed on the first internet enabled wireless mobile device that has direct internet access so long as the previous condition is met, and wherein the computer program product can respond to a signalling communications channel of a third computer program product when executed on a third internet enabled wireless mobile device that has no direct internet access to share its internet access with that third internet enabled wireless mobile device, and wherein no further auto reconfiguration is allowed any further for the third computer program product when executed on the third internet enabled wireless mobile device, meaning the third computer program product will not allow to share internet with any other computer program products.

9. The system of claim 1, wherein the computer program product when executed on the internet enabled wireless mobile device that has direct internet access and has no other different internet enabled wireless mobile device that has no direct internet access within radio range will configure that wireless mobile device with direct internet to set the first local area wireless network only in receive mode, meaning no interaction with any signalling channel, and wherein the computer program product when executed on the internet enabled wireless mobile device that has no direct internet access and has no data communication with any other different internet enabled wireless mobile device that has direct internet access within radio range will configure that wireless mobile device with no direct internet to set the first local area wireless network to transmit internet requests bursts at regular time intervals, meaning using an active signalling communication channel.

10. The system of claim 1, wherein the computer program product when executed on the internet enabled wireless mobile device that has direct internet access and has no data communication exchange for a predefined programmed period with other internet enabled wireless mobile device that has no direct internet access will configure that wireless mobile device with direct internet to set the second local area wireless network only in receive mode, meaning no interaction with any data communication channel, and wherein the computer program product when executed on the internet enabled wireless mobile device that has no direct internet access and has no data communication exchange for a predefined programmed period with other internet enabled wireless mobile device that has direct internet access will configure that wireless mobile device with no direct internet to set the second local area wireless network only in receive mode, meaning no interaction with any data communication channel.

11. The system of claim 1, wherein the first computer program product when executed on the first internet enabled wireless mobile device, and the second computer program product when executed on the second internet enabled wireless mobile device, encrypt the payload of the signalling communication channel when sending it and decrypt the payload of the data signalling communication channel when receiving it with a 128 bit or a 256 bit AES cipher, and encrypt the payload of the data communication channel when sending it and decrypt the payload of the data communication channel when receiving it with a 128 bit or a 256 bit AES cipher.

12. The system of claim 1, wherein the first computer program product when executed on the first internet enabled wireless mobile device with direct internet access, and the second computer program product when executed on the second internet enabled wireless mobile device with no direct internet access, are configured such that the first computer program product of the wireless device with internet access when using the data communication channel automatically creates a socket and de-multiplexes all internet communication requests received from second computer program product of the wireless device with no internet access, into individual separate independent threads per internet communication request which the first computer program product sends to the internet and then each individual separate internet response received on each corresponding individual separate independent thread is multiplexed and send back to the second computer program product of the wireless device with no internet access, the second computer program product of the wireless device with no internet access when using the data communication channel automatically creates and configures a proxy and assigns an IP (internet protocol) address intercepting all internet communication requests from the wireless device with no internet access, then filters all such internet communication requests allowing only through those who use a secure communication request having as the first characters of the URL (uniform resource locator) https and discard automatically all those that don't start with https, before encrypting those communication requests as payload on the data communication channel for transmission to the first computer program product of the wireless device with internet access, and wherein a previously mentioned filter will additionally filter out and discard any internet communication requests different than the allowed internet domains, as defined from time to time in a look-up table of the second computer program product of the wireless device with no internet access or in the first computer program product of the wireless device with internet access or in the event the look-up table is not present, deleted, or empty then all domains are allowed, meaning no internet communication requests to any domains is filtered and all are allowed through from the computer program product of the wireless device with no internet access to the computer program product of the wireless device with internet access.

13. The system of claim 1, wherein the first computer program product when executed on the first internet enabled wireless mobile device with direct internet access, and the second computer program product when executed on the second internet enabled wireless mobile device with no direct internet access, are configured such that the first internet enabled wireless mobile device transceiver output power of the data communication channel is a value extracted from a look-up table in the first computer program product, wherein RSSI (radio signal strength) of the signalling communication channel and or the data communication channel during as received by the second computer program product when executed on the second internet enabled wireless mobile device is used as follows: from −85 dBm and lower as an RRSI band corresponding to maximum output power; from −55 dBm and higher to minimum output power, and linear for values in between, or in the event the look-up table is not present, deleted, or empty then all the data communication transceivers are set to maximum output power.

14. The system of claim 1, wherein the first computer program product when executed on the first internet enabled wireless mobile device with direct internet access, configures the number of allowed computer program products when executed on the internet enabled wireless mobile devices with no internet to connect with the first computer program product executed on the first internet enabled wireless mobile device with direct internet access to a number as extracted from a look-up table as follows: if data communication channel at maximum output power then limit to 4; if data communication channel at minimum output power limit then to 8; and linear for values in between; or in the event the look-up table is not present, deleted, or empty then limit the number of allowed computer program products when executed on the internet enabled wireless mobile devices with no internet to connect to a maximum of 4.

15. The system of claim 1, wherein the second computer program product when executed on the second internet enabled wireless mobile device with no direct internet access, and the first computer program product when executed on the first internet enabled wireless mobile device with direct internet access, are configured such that the second internet enabled wireless mobile device transceiver output power of the signalling communication channel is set to a value extracted from a look-up table in the second computer program product, wherein RSSI (radio signal strength) of the signalling communication channel during as received by the first computer program product when executed on the first internet enabled wireless mobile device is used as follows: from −85 dBm and lower as an RRSI band corresponding to maximum output power; from −55 dBm and higher to minimum output power; and linear for values in between; or in the event the look-up table is not present, deleted, or empty then all the signalling communication transceivers are set to maximum output power.

16. The system of claim 1, wherein the first computer program product is executable on the first internet enabled wireless mobile device to access functions of the first internet enabled wireless mobile device and the second computer program product is executable on the second internet enabled wireless mobile device to access functions of the second internet enabled wireless mobile device.

17. The system of claim 1, wherein the computer program product when executing on the internet enabled wireless mobile device with direct internet access uses the cellular phone network transceiver or the local area network wireless transceiver of the internet enabled wireless mobile device with direct internet access to provide the internet data connection to the internet enabled wireless mobile device with no direct internet access, via the data communication, when the internet enabled wireless mobile device without direct internet access is not using its cellular phone network transceiver nor its local area wireless transceiver for internet data communication.

18. The system of claim 1, wherein the first internet enabled wireless mobile device is configured to download the first computer program product using the transceiver connected to the internet, meaning through the local area wireless transceiver or through the cellular phone network transceiver and, wherein the second internet enabled wireless mobile device is configured in the event it has direct internet access to download the second computer program product using the transceiver connected to the internet, meaning through the local area wireless transceiver or through the cellular phone network transceiver and in the event the second internet enabled wireless mobile device has no direct internet access to download the second computer program product using the local area wireless transceiver to connected to the internet, meaning through the local area wireless transceiver of the first internet enabled wireless mobile device or through the cellular phone network transceiver of the first internet enabled wireless mobile device.

19. The system of claim 1, wherein the computer program product executable on the internet enabled wireless mobile device that has no direct Internet connection will cause an ultra low power consuming beacon to be transmitted through the narrow band local area transceiver of the internet enabled wireless mobile device that has no direct Internet connection, to request for internet access from the computer program product executable on the internet enabled wireless mobile device that has direct Internet connection, via the signalling communication, and wherein the computer program product executable on the internet enabled wireless mobile device that has direct Internet connection will cause a low power consuming beacon to be transmitted through the wide band local area transceiver of the internet enabled wireless mobile device that has direct Internet connection, to provide for internet access from the computer program product executable on the internet enabled wireless mobile device that has direct Internet connection, via the data communication.

20. A system including a first internet enabled wireless mobile device and at least a second internet enabled wireless mobile device, the first internet enabled wireless mobile device including at least three radio transceivers of which at least one transceiver is an ultra low power narrow band first local area wireless transceiver, at least one transceiver is a low power wide band second local area wireless transceiver, and at least one transceiver is a cellular phone network transceiver, a first non-transitory storage medium, and a first computer program product embodied on the first non-transitory storage medium, the first computer program product executable on the first internet enabled wireless mobile device to communicate with a second computer program product when executing on the second internet enabled wireless mobile device, the second internet enabled wireless mobile device including a second non transitory storage medium, the second computer program product embodied on the second non-transitory storage medium, the second internet enabled wireless mobile device including at least three radio transceivers of which at least one transceiver is an ultra low power narrow band first local area wireless transceiver, at least one transceiver is a low power wide band second local area wireless transceiver and at least one transceiver is a cellular phone network transceiver, wherein a signalling communication uses only the first local area wireless transceiver of each internet enabled wireless mobile device and a data communication uses only the second local area wireless transceiver of each internet enabled wireless mobile device and an internet communication source uses one of the two following options: a the cellular phone network transceiver of an internet enabled wireless mobile device, or a low power wide band second local area wireless transceiver, wherein the first computer program product is executable on the first internet enabled wireless mobile device to operate said signalling communication and said data communication, in cooperation with the second computer program product when executing on the second internet enabled wireless mobile device, automatically, upon download of the first computer program product to the first internet enabled wireless mobile device, and upon download of the second computer program product to the second internet enabled wireless mobile device and, wherein the first computer program product when executed on the first internet enabled wireless mobile device does not use any virtual private network function of the first internet enabled wireless mobile device nor any user accessible tethering or personal hotspot function of the first internet enabled wireless mobile device, and the second computer program product when executed on the second internet enabled wireless mobile device does not use any virtual private network function of the first internet enabled wireless mobile device nor any user accessible tethering or personal hotspot function of the first internet enabled wireless mobile device, and wherein in the event the first internet enabled wireless mobile device has a direct internet data connection and the second internet enabled wireless mobile device has no direct internet data connection, the second computer program product is executable on the second internet enabled wireless mobile device to communicate signalling with the first internet enabled wireless mobile device with internet connection via the signalling communication to the first internet enabled wireless mobile device, using the first local area ultra low power narrow band wireless transceiver of the second internet enabled wireless mobile device, the first local area ultra low power narrow band wireless transceiver of the first internet enabled wireless mobile device, and the second computer program product is executable on the second internet enabled wireless mobile device, and the first computer program product is executable on the first internet enabled wireless mobile device, to provide automatically an internet data connection via the data communication to the second internet enabled wireless mobile device, using the second local area low power wide band wireless transceiver of the first internet enabled wireless mobile device, the second local area low power wide band wireless transceiver of the second internet enabled wireless mobile device; and the second computer program product is executable on the second internet enabled wireless mobile device to establish automatically a bidirectional internet data connection via the data communication, and automatically when the data communication is established between the first internet enabled wireless mobile device and the second internet enabled wireless mobile device then the second computer program product when executing on the second internet enabled wireless mobile device stops the signalling communication putting the first ultra low power narrow band transceiver of the second internet enabled wireless mobile device in only receive mode and allows internet communication requests to be passed on from the second computer program product when executing on the second internet enabled wireless mobile device to the first computer program product when executing on the first internet enabled wireless mobile device to the internet and each received corresponding internet response to each corresponding internet communication request is passed back from the first computer program product to the second computer program product, and automatically when the data communication is disrupted, lost or ended between the first internet enabled wireless mobile device and the second internet enabled wireless mobile device then the first computer program product when executing on the first internet enabled wireless mobile device stops the data communication, putting the second low power wide band transceiver of the first internet enabled wireless mobile device in only receive mode and the second computer program of the second internet enabled wireless mobile device re-starts the signalling communication putting the first ultra low power narrow band transceiver of the second internet enabled wireless mobile device in periodical transmit bursts mode requesting for internet access and, wherein in the event the second internet enabled wireless mobile device has a direct internet data connection and the first internet enabled wireless mobile device has no direct internet data connection, the first computer program product is executable on the first internet enabled wireless mobile device to communicate signalling with the device with internet connection via the signalling communication to the internet enabled wireless mobile device, using the first local area ultra low power narrow band wireless transceiver of the first internet enabled wireless mobile device, the first local area ultra low power narrow band wireless transceiver of the second internet enabled wireless mobile device, and the first computer program product when executing on the first internet enabled wireless mobile device, and the second computer program product is executable on the second internet enabled wireless mobile device to provide automatically an internet data connection via the data communication to the first internet enabled wireless mobile device, using the second local area low power wide band wireless transceiver of the second internet enabled wireless mobile device, the second local area low power wide band wireless transceiver of the first internet enabled wireless mobile device, and the first computer program product when executing on the first internet enabled wireless mobile device, to establish automatically a bidirectional internet data connection via the data communication, and automatically when the data communication is established between the second internet enabled wireless mobile device and the first internet enabled wireless mobile device, then the first computer program product when executing on the first internet enabled wireless mobile device stops the signalling communication putting the first ultra low power narrow band transceiver of the first internet enabled wireless mobile device in only receive mode and allows internet communication requests to be passed on from the first computer program product when executing on the first internet enabled wireless mobile device to the second computer program product when executing on the second internet enabled wireless mobile device, to the internet, and each received corresponding internet response to each corresponding internet communication request is passed back from the second computer program product to the first computer program product, and automatically when the data communication is disrupted, lost or ended between the second internet enabled wireless mobile device and the first internet enabled wireless mobile device, then the second computer program product when executing on the second internet enabled wireless mobile device stops the data communication, putting the second low power wide band transceiver of the second internet enabled wireless mobile device in only receive mode and the first computer program of the first internet enabled wireless mobile device re-starts the signalling communication putting the first ultra low power narrow band transceiver of the first internet enabled wireless mobile device in periodical transmit bursts mode requesting for internet access, wherein the computer program product when executed on the internet enabled wireless mobile device that has direct internet access and has no other different internet enabled wireless mobile device that has no direct internet access within radio range will configure that wireless mobile device with direct internet to set the first local area wireless network only in receive mode, meaning no interaction with any signalling channel, and wherein the computer program product when executed on the internet enabled wireless mobile device that has no direct internet access and has no data communication with any other different internet enabled wireless mobile device that has direct internet access within radio range will configure that wireless mobile device with no direct internet to set the first local area wireless network to transmit internet requests bursts at regular time intervals, meaning using an active signalling communication channel.

21. A system including a first internet enabled wireless mobile device and at least a second internet enabled wireless mobile device, the first internet enabled wireless mobile device including at least three radio transceivers of which at least one transceiver is an ultra low power narrow band first local area wireless transceiver, at least one transceiver is a low power wide band second local area wireless transceiver, and at least one transceiver is a cellular phone network transceiver, a first non-transitory storage medium, and a first computer program product embodied on the first non-transitory storage medium, the first computer program product executable on the first internet enabled wireless mobile device to communicate with a second computer program product when executing on the second internet enabled wireless mobile device, the second internet enabled wireless mobile device including a second non transitory storage medium, the second computer program product embodied on the second non-transitory storage medium, the second internet enabled wireless mobile device including at least three radio transceivers of which at least one transceiver is an ultra low power narrow band first local area wireless transceiver, at least one transceiver is a low power wide band second local area wireless transceiver and at least one transceiver is a cellular phone network transceiver, wherein a signalling communication uses only the first local area wireless transceiver of each internet enabled wireless mobile device and a data communication uses only the second local area wireless transceiver of each internet enabled wireless mobile device and an internet communication source uses one of the two following options: a the cellular phone network transceiver of an internet enabled wireless mobile device, or a low power wide band second local area wireless transceiver, wherein the first computer program product is executable on the first internet enabled wireless mobile device to operate said signalling communication and said data communication, in cooperation with the second computer program product when executing on the second internet enabled wireless mobile device, automatically, upon download of the first computer program product to the first internet enabled wireless mobile device, and upon download of the second computer program product to the second internet enabled wireless mobile device and, wherein the first computer program product when executed on the first internet enabled wireless mobile device does not use any virtual private network function of the first internet enabled wireless mobile device nor any user accessible tethering or personal hotspot function of the first internet enabled wireless mobile device, and the second computer program product when executed on the second internet enabled wireless mobile device does not use any virtual private network function of the first internet enabled wireless mobile device nor any user accessible tethering or personal hotspot function of the first internet enabled wireless mobile device, and wherein in the event the first internet enabled wireless mobile device has a direct internet data connection and the second internet enabled wireless mobile device has no direct internet data connection, the second computer program product is executable on the second internet enabled wireless mobile device to communicate signalling with the first internet enabled wireless mobile device with internet connection via the signalling communication to the first internet enabled wireless mobile device, using the first local area ultra low power narrow band wireless transceiver of the second internet enabled wireless mobile device, the first local area ultra low power narrow band wireless transceiver of the first internet enabled wireless mobile device, and the second computer program product is executable on the second internet enabled wireless mobile device, and the first computer program product is executable on the first internet enabled wireless mobile device, to provide automatically an internet data connection via the data communication to the second internet enabled wireless mobile device, using the second local area low power wide band wireless transceiver of the first internet enabled wireless mobile device, the second local area low power wide band wireless transceiver of the second internet enabled wireless mobile device; and the second computer program product is executable on the second internet enabled wireless mobile device to establish automatically a bidirectional internet data connection via the data communication, and automatically when the data communication is established between the first internet enabled wireless mobile device and the second internet enabled wireless mobile device then the second computer program product when executing on the second internet enabled wireless mobile device stops the signalling communication putting the first ultra low power narrow band transceiver of the second internet enabled wireless mobile device in only receive mode and allows internet communication requests to be passed on from the second computer program product when executing on the second internet enabled wireless mobile device to the first computer program product when executing on the first internet enabled wireless mobile device to the internet and each received corresponding internet response to each corresponding internet communication request is passed back from the first computer program product to the second computer program product, and automatically when the data communication is disrupted, lost or ended between the first internet enabled wireless mobile device and the second internet enabled wireless mobile device then the first computer program product when executing on the first internet enabled wireless mobile device stops the data communication, putting the second low power wide band transceiver of the first internet enabled wireless mobile device in only receive mode and the second computer program of the second internet enabled wireless mobile device re-starts the signalling communication putting the first ultra low power narrow band transceiver of the second internet enabled wireless mobile device in periodical transmit bursts mode requesting for internet access and, wherein in the event the second internet enabled wireless mobile device has a direct internet data connection and the first internet enabled wireless mobile device has no direct internet data connection, the first computer program product is executable on the first internet enabled wireless mobile device to communicate signalling with the device with internet connection via the signalling communication to the internet enabled wireless mobile device, using the first local area ultra low power narrow band wireless transceiver of the first internet enabled wireless mobile device, the first local area ultra low power narrow band wireless transceiver of the second internet enabled wireless mobile device, and the first computer program product when executing on the first internet enabled wireless mobile device, and the second computer program product is executable on the second internet enabled wireless mobile device to provide automatically an internet data connection via the data communication to the first internet enabled wireless mobile device, using the second local area low power wide band wireless transceiver of the second internet enabled wireless mobile device, the second local area low power wide band wireless transceiver of the first internet enabled wireless mobile device, and the first computer program product when executing on the first internet enabled wireless mobile device, to establish automatically a bidirectional internet data connection via the data communication, and automatically when the data communication is established between the second internet enabled wireless mobile device and the first internet enabled wireless mobile device, then the first computer program product when executing on the first internet enabled wireless mobile device stops the signalling communication putting the first ultra low power narrow band transceiver of the first internet enabled wireless mobile device in only receive mode and allows internet communication requests to be passed on from the first computer program product when executing on the first internet enabled wireless mobile device to the second computer program product when executing on the second internet enabled wireless mobile device, to the internet, and each received corresponding internet response to each corresponding internet communication request is passed back from the second computer program product to the first computer program product, and automatically when the data communication is disrupted, lost or ended between the second internet enabled wireless mobile device and the first internet enabled wireless mobile device, then the second computer program product when executing on the second internet enabled wireless mobile device stops the data communication, putting the second low power wide band transceiver of the second internet enabled wireless mobile device in only receive mode and the first computer program of the first internet enabled wireless mobile device re-starts the signalling communication putting the first ultra low power narrow band transceiver of the first internet enabled wireless mobile device in periodical transmit bursts mode requesting for internet access, wherein the first computer program product when executed on the first internet enabled wireless mobile device with direct internet access, and the second computer program product when executed on the second internet enabled wireless mobile device with no direct internet access, are configured such that the first computer program product of the wireless device with internet access when using the data communication channel automatically creates a socket and de-multiplexes all internet communication requests received from second computer program product of the wireless device with no internet access, into individual separate independent threads per internet communication request which the first computer program product sends to the internet and then each individual separate internet response received on each corresponding individual separate independent thread is multiplexed and send back to the second computer program product of the wireless device with no internet access, the second computer program product of the wireless device with no internet access when using the data communication channel automatically creates and configures a proxy and assigns an IP (internet protocol) address intercepting all internet communication requests from the wireless device with no internet access, then filters all such internet communication requests allowing only through those who use a secure communication request having as the first characters of the URL (uniform resource locator) https and discard automatically all those that don't start with https, before encrypting those communication requests as payload on the data communication channel for transmission to the first computer program product of the wireless device with internet access, and wherein a previously mentioned filter will additionally filter out and discard any internet communication requests different than the allowed internet domains, as defined from time to time in a look-up table of the second computer program product of the wireless device with no internet access or in the first computer program product of the wireless device with internet access or in the event the look-up table is not present, deleted, or empty then all domains are allowed, meaning no internet communication requests to any domains is filtered and all are allowed through from the computer program product of the wireless device with no internet access to the computer program product of the wireless device with internet access.

\* \* \* \* \*